(12) United States Patent
Hatanaka et al.

(10) Patent No.: US 10,557,978 B2
(45) Date of Patent: Feb. 11, 2020

(54) COMPOSITION, OPTICAL FILM INCLUDING COMPOSITION, AND METHOD OF PRODUCING OPTICAL FILM

(71) Applicant: SUMITOMO CHEMICAL COMPANY, LIMITED, Tokyo (JP)

(72) Inventors: Nobuyuki Hatanaka, Osaka (JP); Haruki Okawa, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 15/215,754

(22) Filed: Jul. 21, 2016

(65) Prior Publication Data
US 2017/0022417 A1    Jan. 26, 2017

(30) Foreign Application Priority Data

Jul. 24, 2015 (JP) .................................. 2015-147140

(51) Int. Cl.
| | | |
|---|---|---|
| *G02F 1/1334* | (2006.01) | |
| *G02B 5/30* | (2006.01) | |
| *C09K 19/60* | (2006.01) | |
| *C09D 135/02* | (2006.01) | |
| *C09D 7/41* | (2018.01) | |

(52) U.S. Cl.
CPC ............ *G02B 5/3016* (2013.01); *C09D 7/41* (2018.01); *C09D 135/02* (2013.01); *C09K 19/601* (2013.01)

(58) Field of Classification Search
CPC .................................................... G02F 1/1334
See application file for complete search history.

(56) References Cited

U.S. PATENT DOCUMENTS

| | | | | |
|---|---|---|---|---|
| 2,917,549 | A * | 12/1959 | Knowles | ........... C07C 31/13 528/307 |
| 4,849,130 | A | 7/1989 | Dabrowski et al. | |
| 5,104,572 | A | 4/1992 | Ozawa et al. | |
| 5,389,285 | A | 2/1995 | Shannon et al. | |
| 5,474,705 | A | 12/1995 | Janulis et al. | |
| 2007/0024970 | A1 | 2/2007 | Lub et al. | |
| 2010/0045900 | A1* | 2/2010 | Peeters | ............... C09K 19/54 349/74 |
| 2010/0059710 | A1* | 3/2010 | Choi | .................. C07D 309/08 252/299.61 |
| 2010/0208181 | A1 | 8/2010 | Fiebranz et al. | |
| 2010/0267858 | A1 | 10/2010 | Lub et al. | |
| 2013/0092874 | A1 | 4/2013 | Bacher et al. | |

FOREIGN PATENT DOCUMENTS

| | | |
|---|---|---|
| DE | 210769 A1 | 6/1984 |
| DE | 59-217785 A | 12/1984 |
| JP | 62-167758 A | 7/1987 |
| JP | 63-1357 B2 | 1/1988 |
| JP | 63-81195 A | 4/1988 |
| JP | 2-56456 A | 2/1990 |
| JP | 5-216020 A | 8/1993 |
| JP | 6-228562 A | 8/1994 |
| JP | 07011253 A * | 1/1995 |
| JP | 7-224282 A | 8/1995 |
| JP | 2002-193852 A | 7/2002 |
| JP | 2002-193853 A | 7/2002 |
| JP | 2007-510946 A | 4/2007 |
| JP | 2010-191422 A | 9/2010 |
| JP | 2013-101328 A | 5/2013 |
| JP | 2013101328 A * | 5/2013 |
| JP | 2013-534945 A | 9/2013 |
| WO | WO 93/22396 A1 | 11/1993 |

OTHER PUBLICATIONS

International Preliminary Report on Patentability and English translation of the Written Opinion of the International Searching Authority (Forms PCT/IB/338, PCT/IB/373 and PCT/ISA/237) for Application No. PCT/JP2016/054616, dated Sep. 8, 2017.
International Search Report (Form PCT/ISA/210) for Application No. PCT/JP2016/054616, dated May 17, 2016.
Japanese Office Action and English translation for Japanese Application No. 2015-039531, dated Mar. 12, 2019.
Szadowski et al., "Effect of dye solubility in polyglycol on its suitability for 'Cellestren' printing," Przegląd Włókienniczy, 1988, pp. 436-439, with English translation.
U.S. Office Action for U.S. Appl. No. 15/553,650, dated Jan. 2, 2019.
Japanese Office Action, dated Jun. 4, 2019, for Japanese Application No. 2015-039531, with an English translation.
Taiwanese Office Action and Search Report for Taiwanese Application No. 105105994, dated Jul. 29, 2019, with English translation.
Japanese Office Action, dated Oct. 29, 2019, for Japanese Application No. 2015-039531, with an English translation.

* cited by examiner

*Primary Examiner* — Chanceity N Robinson
(74) *Attorney, Agent, or Firm* — Birch, Stewart, Kolasch & Birch, LLP

(57) ABSTRACT

The present invention provides, as a composition containing a smectic liquid crystal compound which can be used for production of a homogeneous optical film at a temperature around room temperature, a composition containing a smectic liquid crystal compound having a 1,4-cyclohexyl group, which smectic liquid crystal compound having the 1,4-cyclohexyl group contains (i) 100 parts by mass of a smectic liquid crystal compound having a trans-1,4-cyclohexyl group and (ii) 0.1 parts by mass to 10 parts by mass of a smectic liquid crystal compound having a cis-1,4-cyclohexyl group.

11 Claims, No Drawings

COMPOSITION, OPTICAL FILM INCLUDING COMPOSITION, AND METHOD OF PRODUCING OPTICAL FILM

This Nonprovisional application claims priority under 35 U.S.C. § 119 on Patent Application No. 2015-147140 filed in Japan on Jul. 24, 2015, the entire contents of which are hereby incorporated by reference.

TECHNICAL FIELD

The present invention relates to (i) a composition, (ii) an optical film including a composition, and (iii) a method of producing an optical film. More specifically, the present invention relates to (i) a composition serving as a liquid crystal material which can be applied to an optical film, (ii) an optical film including a composition, and (iii) a method of producing an optical film.

BACKGROUND ART

Liquid crystal materials can be applied to optical films such as polarizing plates and wave plates for use in flat panel display devices (FPD). As such a liquid crystal material, a polymerizable liquid crystal compound, which brings about a higher-order smectic liquid crystal phase including a cycloalkane-derived structure, has been the focus on attention.

Meanwhile, in order to make the polymerizable liquid crystal compound (including a composition containing the liquid crystal compound) into an optical film, it is necessary to (i) apply the polymerizable liquid crystal compound to a base material and dry the polymerizable liquid crystal compound and then (ii) polymerize the liquid crystal compound at a temperature which falls within a range of temperatures at which a higher-order smectic liquid crystal phase is exhibited and which is equal to or more than a crystal transition temperature. In theory, a defect-free, homogeneous optical film can be obtained by polymerizing the liquid crystal compound at a temperature satisfying the above temperature conditions. In a case where the liquid crystal compound is polymerized with the use of a photopolymerization initiator, however, there exist heat including (i) heat generated by a light source and (ii) heat of polymerization. Therefore, it is extremely difficult to control a temperature during polymerization so that the temperature falls within a desired range. In practice, therefore, it is necessary to polymerize the polymerizable liquid crystal compound at a temperature around room temperature. That is, the polymerizable liquid crystal compound needs to be a compound which brings about a non-crystallizable, higher-order smectic liquid crystal phase at a temperature around room temperature.

CITATION LIST

Patent Literature 1

Japanese Translation of PCT International Application Publication, Tokuhyo, No. 2007-510946 (Publication Date: Apr. 26, 2007)

SUMMARY OF INVENTION

Technical Problem

However, a higher-order smectic liquid crystal phase falls between a liquid crystal phase and a crystal phase. Therefore, essentially, a conventional polymerizable liquid crystal compound, which brings about a higher-order smectic liquid crystal phase including a cycloalkane-derived structure, becomes easily crystallized at a temperature around room temperature. Therefore, it was difficult to produce a homogeneous optical film at a temperature around room temperature.

Therefore, since it is difficult at room temperature to polymerize a conventional liquid crystal compound containing a cyclohexane ring, there are problems such as (i) a major restriction on a device for producing an optical film by use of the liquid crystal compound and (ii) inevitability of polymerizing, in producing the optical film, the liquid crystal compound during heating where temperature control is difficult.

Furthermore, there is also a problem that, in a case where another liquid crystal compound is added in order to restrict crystallization of a polymerizable liquid crystal compound, liquid crystallinity of the polymerizable liquid crystal compound becomes reduced, and therefore properties of an optical film to be obtained deteriorate.

Solution to Problem

In order to solve the problems, the present invention provides the following [1] through [16]:

[1] A composition comprising a smectic liquid crystal compound having a 1,4-cyclohexyl group,
wherein the smectic liquid crystal compound has the 1,4-cyclohexyl group comprises 0.1 parts by mass to 10 parts by mass of a smectic liquid crystal compound having a cis-1,4-cyclohexyl group relative to 100 parts by mass of a smectic liquid crystal compound having a trans-1,4-cyclohexyl group.

[2] The composition as set forth in [1], wherein the smectic liquid crystal compound having the trans-1,4-cyclohexyl group and the smectic liquid crystal compound having the cis-1,4-cyclohexyl group each have a polymerizable group.

[3] The composition as set forth in [2], wherein the smectic liquid crystal compound having the trans-1,4-cyclohexyl group and the smectic liquid crystal compound having the cis-1,4-cyclohexyl group are represented by the following formula (1-1) and formula (2-1), respectively:

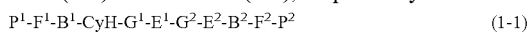

$$P^1\text{-}F^1\text{-}B^1\text{-}CyH\text{-}G^1\text{-}E^1\text{-}G^2\text{-}E^2\text{-}B^2\text{-}F^2\text{-}P^2 \quad (1\text{-}1)$$

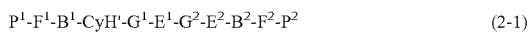

$$P^1\text{-}F^1\text{-}B^1\text{-}CyH'\text{-}G^1\text{-}E^1\text{-}G^2\text{-}E^2\text{-}B^2\text{-}F^2\text{-}P^2 \quad (2\text{-}1)$$

wherein in each of the formulas (1-1) and (2-1):
$P^1$ and $P^2$ each independently represent a polymerizable group, $P^1$ in the formula (1-1) and $P^1$ in the formula (2-1) are identical groups, and $P^2$ in the formula (1-1) and $P^2$ in the formula (2-1) are identical groups;
at least one of $F^1$ and $F^2$ represents a C6-C12 linear alkanediyl group, a hydrogen atom contained in the alkanediyl group can be substituted by a halogen atom, and —$CH_2$— contained in the alkanediyl group can be substituted by —O—, $F^1$ in the formula (1-1) and $F^1$ in the formula (2-1) are identical groups, and $F^2$ in the formula (1-1) and $F^2$ in the formula (2-1) are identical groups;
$B^1$ and $B^2$ each independently represent a single bond or a bivalent linking group, $B^1$ in the formula (1-1) and $B^1$ in the formula (2-1) are identical groups, and $B^2$ in the formula (1-1) and $B^2$ in the formula (2-1) are identical groups;
CyH represents a substituted or unsubstituted trans-1,4-cyclohexyl group;
CyH' represents a substituted or unsubstituted cis-1,4-cyclohexyl group;

G¹ and G² each independently represent a single bond or a bivalent linking group, G¹ in the formula (1-1) and G¹ in the formula (2-1) are identical groups, and G² in the formula (1-1) and G² in the formula (2-1) are identical groups; and E¹ and E² each independently represent a group selected from a substituted 1,4-phenyl group, an unsubstituted 1,4-phenyl group, a substituted trans-1,4-cyclohexyl group, and an unsubstituted trans-1,4-cyclohexyl group, E¹ in the formula (1-1) and E¹ in the formula (2-1) are identical groups, and E² in the formula (1-1) and E² in the formula (2-1) are identical groups.

[4] The composition as set forth in [3], wherein the smectic liquid crystal compound represented by the formula (1-1) and the another compound represented by the formula (2-1) are represented by the following formula (1-2) and formula (2-2), respectively:

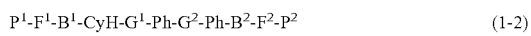

$$P^1\text{-}F^1\text{-}B^1\text{-}CyH\text{-}G^1\text{-}Ph\text{-}G^2\text{-}Ph\text{-}B^2\text{-}F^2\text{-}P^2 \quad (1\text{-}2)$$

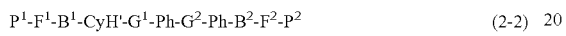

$$P^1\text{-}F^1\text{-}B^1\text{-}CyH'\text{-}G^1\text{-}Ph\text{-}G^2\text{-}Ph\text{-}B^2\text{-}F^2\text{-}P^2 \quad (2\text{-}2)$$

wherein in each of the formulas (1-2) and (2-2):

$P^1$, $P^2$, $F^1$, $F^2$, $B^1$, $B^2$, CyH, CyH', $G^1$, and $G^2$ represent respective groups identical to corresponding ones of the groups representing $P^1$, $P^2$, $F^1$, $F^2$, $B^1$, $B^2$, CyH, CyH', $G^1$, and $G^2$ in the formulas (1-1) and (2-1); and Ph represents a substituted or unsubstituted 1,4-phenyl group.

[5] The composition as set forth in [3] or [4], wherein

B¹ and B² each independently represent a single bond or a bivalent linking group represented by —O—; and G¹ and G² each independently represent a bivalent linking group represented by —C(=O)—O—.

[6] The composition as set forth in any one of [3] through [5], wherein P¹ and P² each independently represent an acryloyloxy group.

[7] The composition as set forth in [1], further comprising a dichroic dye.

[8] The composition as set forth in any one of [2] through [6], further comprising a dichroic dye.

[9] The composition as set forth in [7] or [8], wherein the dichroic dye is a compound represented by the following formula (3-1):

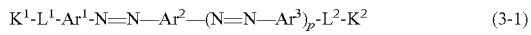

$$K^1\text{-}L^1\text{-}Ar^1\text{-}N{=}N\text{-}Ar^2\text{-}(N{=}N\text{-}Ar^3)_p\text{-}L^2\text{-}K^2 \quad (3\text{-}1)$$

wherein:

K¹ and K² each independently represent a functional group selected from the group consisting of a C1-C12 chain alkyl group, a C5-C6 cyclic alkyl group, an N-piperidinyl group, an N-piperazinyl group, an N-pyrrolidinyl group, an N-morpholinyl group, an N,N-diethylamino group, a cyano group, and a sulfonylmethyl group;

L¹ and L² each independently represent a single bond or a bivalent linking group; and Ar¹ through Ar³ each independently represent (i) a substituted or unsubstituted 1,4-phenylene group, (ii) a substituted or unsubstituted naphthalene-1,4-diyl group, or (iii) a bivalent heterocyclic group which can have a substituent; and p represents an integer selected from 0 to 2.

[10] The composition as set forth in [9], wherein the compound represented by the formula (3-1) is a compound represented by the following formula (3-2):

$$K^1\text{-}L^1\text{-}Ar^1\text{-}N{=}N\text{-}Ar^2\text{-}N{=}N\text{-}Ar^3\text{-}L^2\text{-}K^2 \quad (3\text{-}2)$$

wherein $K^1$, $K^2$, $L^1$, $L^2$, $Ar^1$, $Ar^2$, and $Ar^3$ are same as those of the formula (3-1).

[11] A liquid crystal composition of a smectic liquid crystal compound having a 1,4-cyclohexyl group, wherein the smectic liquid crystal compound has the 1,4-cyclohexyl group comprises (i) a smectic liquid crystal compound having a trans-1,4-cyclohexyl group and (ii) a smectic liquid crystal compound having a cis-1,4-cyclohexyl group, the smectic liquid crystal compound having the cis-1,4-cyclohexyl group being contained in an amount of 0.1 parts by mass to 10 parts by mass relative to 100 parts by mass of the smectic liquid crystal compound having the trans-1,4-cyclohexyl group.

[12] The liquid crystal composition as set forth in [11], wherein the smectic liquid crystal compound having the trans-1,4-cyclohexyl group and the smectic liquid crystal compound having the cis-1,4-cyclohexyl group each have a polymerizable group.

[13] The composition as set forth in any one of [1] through [10], wherein the composition is a raw material of an optical film.

[14] The liquid crystal composition as set forth in [11] or [12], wherein the liquid crystal composition is a raw material of an optical film.

[15] An optical film comprising the composition as set forth in any one of [1] through [10], the optical film having a dichroic ratio of equal to or more than 30.

[16] An optical film comprising (i) a polymer of the smectic liquid crystal compound having the trans-1,4-cyclohexyl group which is a smectic liquid crystal compound having the trans-1,4-cyclohexyl group contained in the composition as set forth in any one of [2] through [6] and [8] and (ii) a polymer of the smectic liquid crystal compound having the cis-1,4-cyclohexyl group which is a smectic liquid crystal compound having the cis-1,4-cyclohexyl group contained in the composition as set forth in any one of [2] through [6] and [8], the optical film having a dichroic ratio of equal to or more than 30.

[17] A method of producing an optical film, comprising the steps of:

(1) applying the composition as set forth in any one of [1] through [11] to a resin base material so as to shape the composition into a form of a film;

(2) heating the composition which has been thus shaped into the form of a film; and (3) cooling the composition, which has been thus heated, to a temperature equal to or less than 30° C. so as to subject the composition to smectic liquid crystal alignment.

Advantageous Effects of Invention

A composition of the present invention is unlikely to be crystallized at a temperature around room temperature, and is therefore easily made into a film. In addition, a film to be obtained from the composition of the present invention can show a high dichroic ratio.

Furthermore, by employing an optical film production method of the present invention, it is possible to produce a homogeneous optical film at a temperature around room temperature.

DESCRIPTION OF EMBODIMENTS

[Embodiment 1: Composition]

The present invention is a composition which contains a smectic liquid crystal compound having a 1,4-cyclohexyl group, the smectic liquid crystal compound having the 1,4-cyclohexyl group containing (i) a smectic liquid crystal compound having a trans-1,4-cyclohexyl group (hereinafter, such a compound may be referred to as "trans isomer") and (ii) a smectic liquid crystal compound having a cis-1,4-cyclohexyl group (hereinafter, such a compound may be referred to as "cis isomer"). An amount of the cis isomer contained is 0.1 parts by mass to 10 parts by mass relative to 100 parts by mass of the trans isomer. The amount of the cis isomer contained is preferably equal to or more than 0.3 parts by mass, more preferably equal to or more than 0.5 parts by mass, still more preferably equal to or more than 0.7 parts by mass, and still even more preferably equal to or more than 1 part by mass. In addition, the amount of the cis isomer contained is preferably equal to or less than 7 parts by mass and more preferably equal to or less than 5 parts by mass. In a case where the amount of the cis isomer contained is equal to or less than 10 parts by mass relative to 100 parts by mass of the trans isomer, liquid crystallinity of the composition of the present invention can be secured, and therefore an optical film, which is to be obtained from the composition of the present invention, tends to show a high dichroic ratio. Specifically, the optical film tends to show a dichroic ratio of equal to or more than 30. In a case where the amount of the cis isomer contained is equal to or more than 0.1 parts by mass relative to 100 parts by mass of the trans isomer, the composition of the present invention becomes unlikely to be crystallized, and a phase transition temperature tends to be reduced. Therefore, use of the composition can allow a homogeneous optical film to be produced at a temperature around room temperature. Note that a smectic liquid crystal compound herein refers to a compound which can bring about a smectic liquid crystal phase by itself.

Preferably, the trans isomer and the cis isomer included in the composition of the present invention each have a polymerizable group. For production of a highly weather resistant optical film, it is preferable that (i) a composition, which is to be a raw material for the optical film, is applied to a substrate or a ground substance and then dried, and then (ii) a compound in the composition is polymerized. Therefore, in a case where a trans isomer and a cis isomer each have a polymerizable group, the cis isomer and the trans isomer can each be suitable as a raw material for an optical film.

The trans isomer included in the composition of the present invention is a compound represented by the following formula (1-1) (hereinafter, such a compound may be referred to as "Compound (1-1)"), and the cis isomer included in the composition of the present invention is preferably a compound represented by the following formula (2-1) (hereinafter, such a compound may be referred to as "Compound (2-1)").

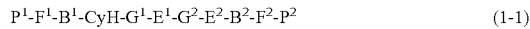
$$P^1\text{-}F^1\text{-}B^1\text{-}CyH\text{-}G^1\text{-}E^1\text{-}G^2\text{-}E^2\text{-}B^2\text{-}F^2\text{-}P^2 \quad (1\text{-}1)$$

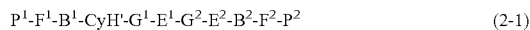
$$P^1\text{-}F^1\text{-}B^1\text{-}CyH'\text{-}G^1\text{-}E^1\text{-}G^2\text{-}E^2\text{-}B^2\text{-}F^2\text{-}P^2 \quad (2\text{-}1)$$

wherein (in each of the formulas (1-1) and (2-1)):

at least one of $P^1$ and $P^2$ represents a polymerizable group, and preferably $P^1$ and $P^2$ each independently represent a polymerizable group;

$F^1$ and $F^2$ each independently represent a C6-C12 linear alkanediyl group, wherein (i) a hydrogen atom contained in the alkanediyl group can be substituted by a halogen atom and (ii) —$CH_2$— contained in the alkanediyl group can be substituted by —O—;

$B^1$ and $B^2$ each independently represent a single bond or a bivalent linking group;

CyH represents a substituted or unsubstituted trans-1,4-cyclohexyl group;

CyH' represents a substituted or unsubstituted cis-1,4-cyclohexyl group;

$G^1$ and $G^2$ each independently represent a single bond or a bivalent linking group; and $E^1$ and $E^2$ each independently represent a group selected from a substituted 1,4-phenyl group, an unsubstituted 1,4-phenyl group, a substituted trans-1,4-cyclohexyl group, and an unsubstituted trans-1,4-cyclohexyl group In the following description, (i) "liquid crystal compound" refers to a smectic liquid crystal compound having a trans-1,4-cyclohexyl group and (ii) "liquid crystal composition" contains a smectic liquid crystal compound having a trans-1,4-cyclohexyl group and a smectic liquid crystal compound having a cis-1,4-cyclohexyl group. The composition of the present invention is a composition containing the "liquid crystal composition". In addition, the present invention can be the above described "liquid crystal composition" containing the smectic liquid crystal compound having the trans-1,4-cyclohexyl group and the smectic liquid crystal compound having the cis-1,4-cyclohexyl group. A percentage of the liquid crystal composition contained in the composition of the present invention relative to 100 parts by mass of a solid content of the composition is normally 50 parts by mass to 99.5 parts by mass, preferably 60 parts by mass to 99 parts by mass, more preferably 70 parts by mass to 98 parts by mass, and still more preferably 80 parts by mass to 97 parts by mass. In a case where the percentage of the liquid crystal composition contained falls within these ranges, an alignment property tends to be high. Note that a solid content herein refers to a total amount of all components of a composition except for a solvent.

The polymerizable group ($P^1$ and $P^2$ in each of the formulas (1-1) and (2-1)) only needs to be a group that can be involved in a polymerization reaction of a liquid crystal compound contained in the composition of the present invention. Specific examples of the polymerizable group encompass a vinyl group, a vinyloxy group, a styryl group, a p-(2-phenylethenyl)phenyl group, an acryloyl group, a methacryloyl group, an acryloyloxy group, a methacryloyloxy group, a carboxy group, an acetyl group, a hydroxy group, a carbamoyl group, a C1-C4 N-alkyl amino group, an amino group, an epoxy group, an oxetanyl group, a formyl group, an isocyanato group, and an isothiocyanato group. Among these groups, (i) a radical polymerizable group and a cation polymerizable group are preferable from the viewpoint that a radical polymerizable group and a cation polymerizable group are each suitable for photopolymerization and (ii) an acryloyloxy group and a methacryloyloxy group are preferable, and an acryloyloxy group is particularly preferable from the viewpoint that an acryloyloxy group and a methacryloyloxy group are easy to handle and allow the compound of the present invention to be easily produced.

In each of Compounds (1-1) and (2-1), the polymerizable group can be directly bonded to $F^1$ and $F^2$, but is preferably bonded to $F^1$ and $F^2$ via at least one bivalent linking group (such as bivalent linking groups listed below as examples of $B^1$ and $B^2$).

Examples of C6-C12 linear alkanediyl groups which are $F^1$ and $F^2$ in each of Compounds (1-1) and (2-1) encompass —$(CH_2)_6$—, —$(CH_2)_7$—, —$(CH_2)_8$—, —$(CH_2)_9$—, —$(CH_2)_{10}$—, —$(CH_2)_{11}$—, —$(CH_2)_{12}$—, —$(CF_2)_6$—, —$(CF_2)_8$—, —$(CF_2)_{11}$—, and —$(CF_2)_{12}$—. Among these linear alkanediyl groups, —$(CH_2)_9$—, —$(CH_2)_{10}$—, and —$(CH_2)_{11}$— are raw materials that can be obtained easily, and are therefore more preferable as $F^1$ and $F^2$. In addition, —(CH$_2$)$_6$— and —(CH$_2$)$_{11}$— are inexpensive raw materials, and are therefore still more preferable as F$^1$ and F$^2$.

Examples of bivalent linking groups which are B$^1$ and B$^2$ in each of Compounds (1-1) and (2-1) encompass —CR$^9$R$^{10}$—, —CH$_2$—CH$_2$—, —O—, —S—, —CO—O—, —O—CO—, —O—CO—O—, —C(=S)—O—, —O—C(=S)—, —O—C(=S)—O—, —CO—NR$^{11}$—, —NR$^{11}$—CO—, —O—CH$_2$—, —CH$_2$—O—, —S—CH$_2$—, —CH$_2$—S—, —NR$^{11}$—, and —CR$^9$=CR$^{10}$—. Note that R$^9$ and R$^{10}$ each independently represent hydrogen or a methyl group. R$^{11}$ represents hydrogen, a methyl group, or an ethyl group. Among these, hydrogen is more preferable as each of R$^9$ and R$^{10}$, and hydrogen is more preferable as R$^{11}$.

Of these, B$^1$ and B$^2$ are each preferably —O—, —CO—O—, —O—CO—, —O—CO—O—, —CO—NH—, —NH—CO—, or a single bond, and are each more preferably (i) a single bond or (ii) a bivalent linking group represented by —O—.

Examples of bivalent linking groups which are G$^1$ and G$^2$ in each of Compounds (1-1) and (2-1) encompass a single bond, —CR$^9$R$^{10}$—, —CH$_2$—CH$_2$—, —CO—O—, —O—CO—, —C(=S)—O—, —O—C(=S)—, —CO—NR$^{11}$—, —NR$^{11}$—CO—, —O—CH$_2$—, —CH$_2$—O—, —S—CH$_2$—, —CH$_2$—S—, and —CR$^9$=CR$^{10}$—. Note that R$^9$ and R$^{10}$ each independently represent hydrogen or a methyl group. R$^{11}$ represents hydrogen, a methyl group, or an ethyl group.

Of these, G$^1$ and G$^2$ are each preferably —CO—O—, —O—CO—, —CO—NH—, —NH—CO—, or a single bond, and are each more preferably a bivalent linking group represented by —C(=O)—O—.

In each of Compounds (1-1) and (2-1), E$^1$ and E$^2$ are each independently a group selected from a substituted 1,4-phenyl group, an unsubstituted 1,4-phenyl group, a substituted trans-1,4-cyclohexyl group, and an unsubstituted trans-1,4-cyclohexyl group. Among these, an unsubstituted 1,4-phenyl group is easy to produce, and is therefore more preferable as each of E$^1$ and E$^2$. Specifically, Compound (1-1) is preferably a compound represented by the following formula (1-2), and Compound (2-1) is preferably a compound represented by the following formula (2-2):

P$^1$-F$^1$-B$^1$-CyH-G$^1$-Ph-G$^2$-Ph-B$^2$-F$^2$-P$^2$ (1-2)

P$^1$-F$^1$-B$^1$-CyH'-G$^1$-Ph-G$^2$-Ph-B$^2$-F$^2$-P$^2$ (2-2)

wherein (in each of the formulas (1-2) and (2-2)):

P$^1$, P$^2$, F$^1$, F$^2$, B$^1$, B$^2$, CyH, CyH', G$^1$ and G$^2$ represent the respective groups as described earlier; and Ph represents a substituted or unsubstituted 1,4-phenyl group.

The following formulas (1-1-1) through (2-1-24) are specific examples of the formulas representing Compounds (1-1) and (2-1) contained in the composition of the present invention. Note that "trans" means that CyH (cyclohexane ring at the farthest left in each of the following structural formulas) in Compound (1-1) is a 1,4-trans isomer, and that "cis" means that CyH' (cyclohexane ring at the farthest left in each of the following structural formulas) in Compound (2-1) is a 1,4-cis isomer.

[Chem. 1]

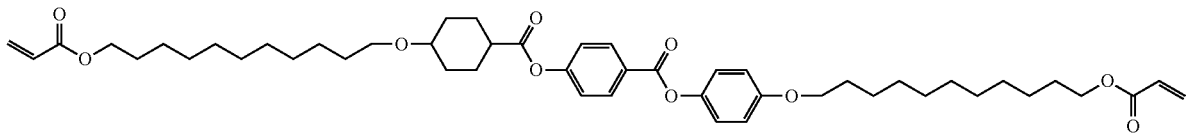

(1-1-1: trans-)
(2-1-1: cis-)

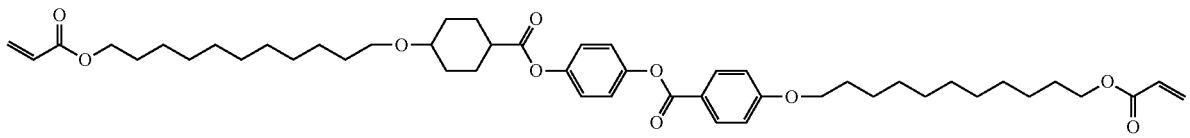

(1-1-2: trans-)
(2-1-2: cis-)

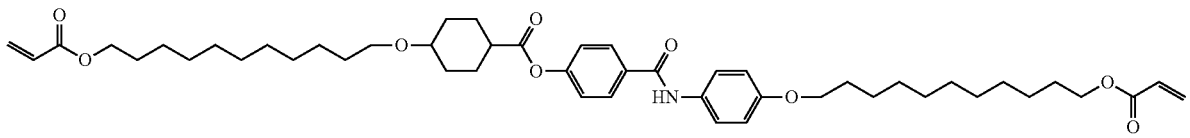

(1-1-3: trans-)
(2-1-3: cis-)

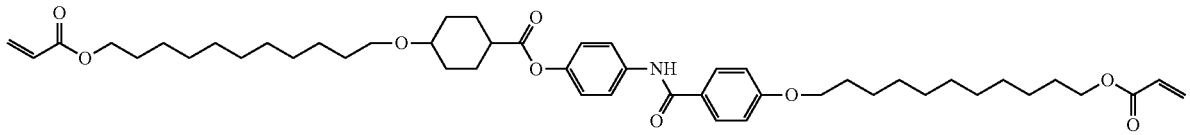

(1-1-4: trans-)
(2-1-4: cis-)

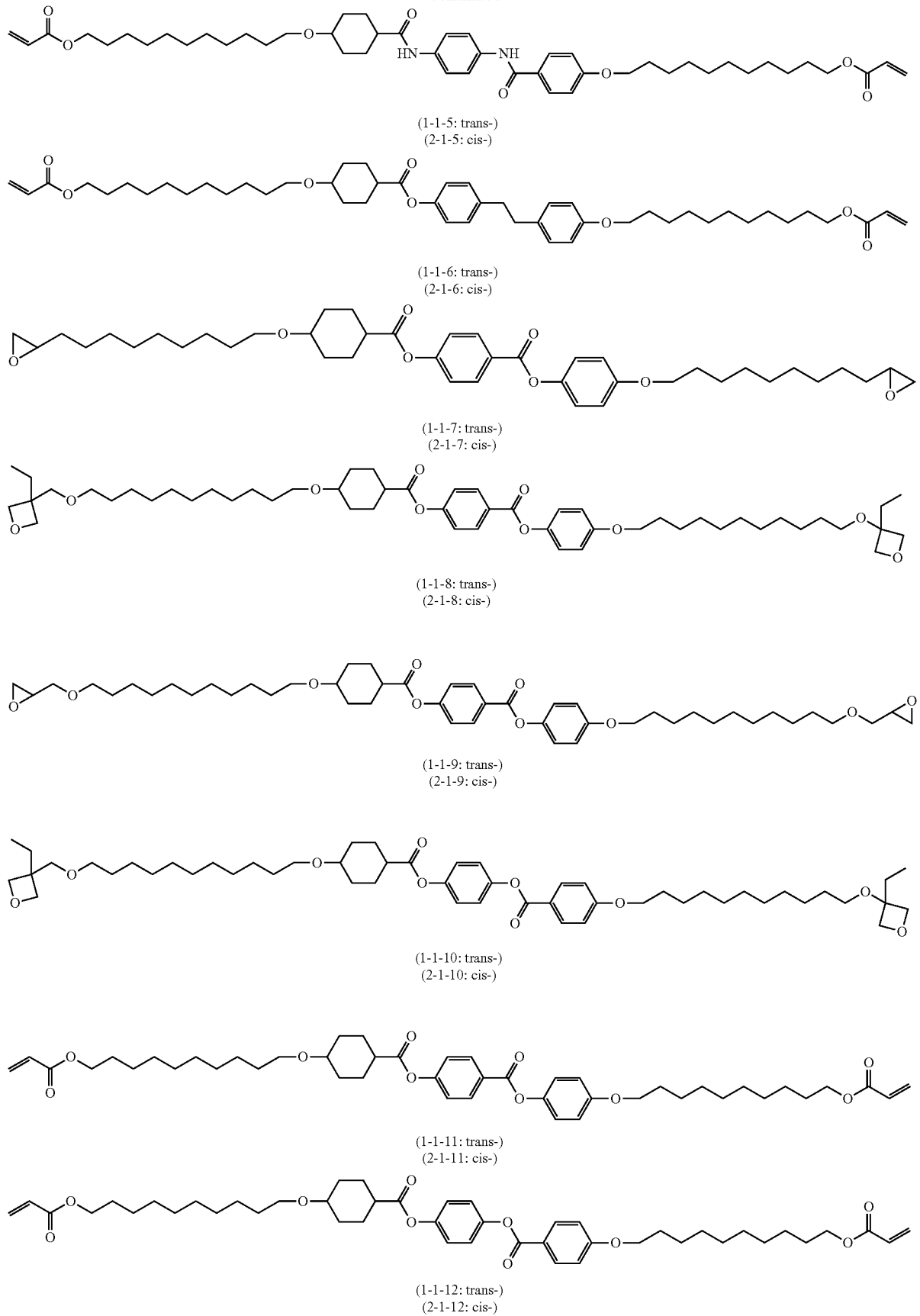

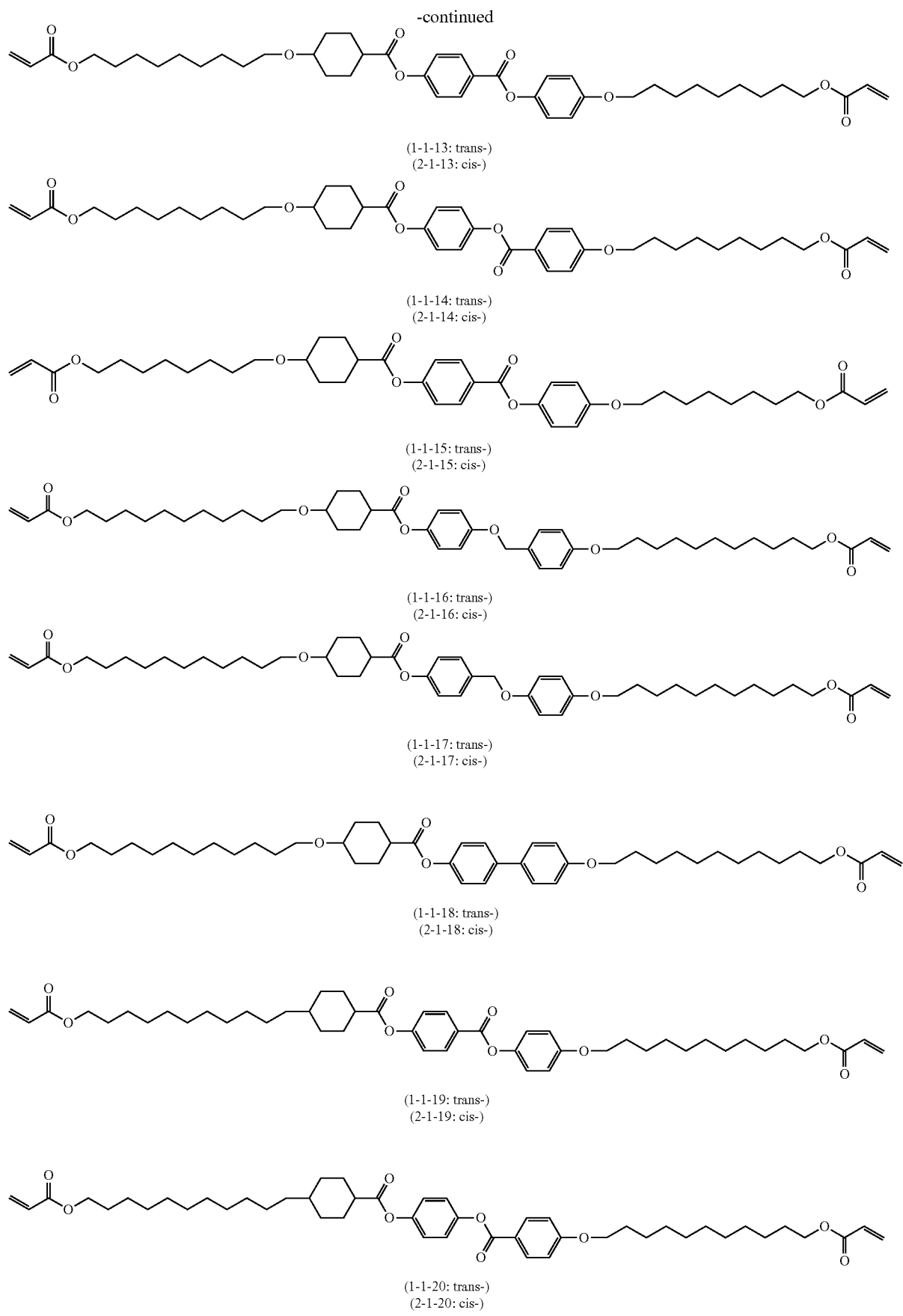

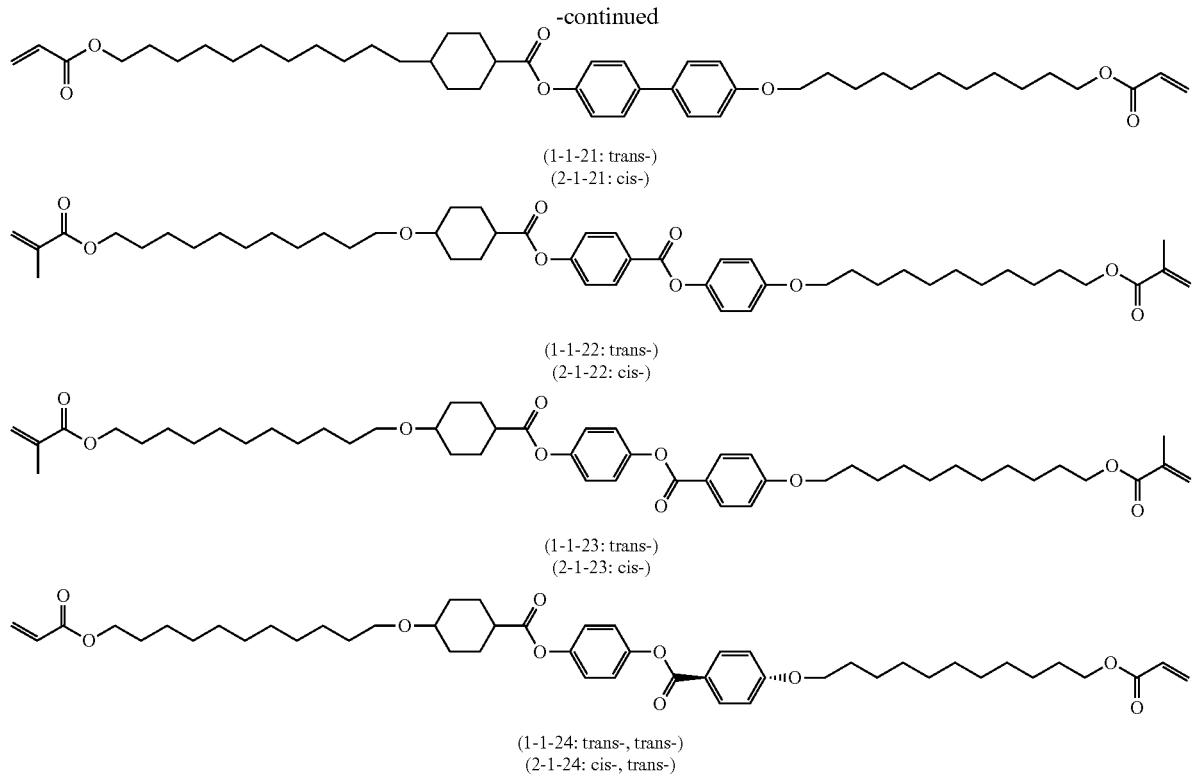

(1-1-21: trans-)
(2-1-21: cis-)

(1-1-22: trans-)
(2-1-22: cis-)

(1-1-23: trans-)
(2-1-23: cis-)

(1-1-24: trans-, trans-)
(2-1-24: cis-, trans-)

The composition of the present invention can contain a liquid crystal compound (hereinafter referred to as "third liquid crystal compound) other than a trans isomer and a cis isomer. Examples of the third liquid crystal compound encompass a smectic liquid crystal compound and a nematic liquid crystal compound. An amount of the third liquid crystal compound contained in the composition of the present invention relative to 100 parts by mass of the trans isomer is preferably equal to or less than 1 part by mass, and more preferably equal to or less than 0.1 parts by mass. In a case where the amount of the third liquid crystal compound contained is equal to or less than 1 part by mass, good liquid crystallinity of a trans isomer and a good alignment status of the trans isomer can be maintained, and therefore disorder of an alignment status becomes little. This tends to causes a dichroic ratio of an optical film, which is to be obtained, to be high.

The composition of the present invention preferably further contains a polymerization initiator. The polymerization initiator preferably contains a photopolymerization initiator. The photopolymerization initiator preferably generates a radical in response to irradiation of light.

Examples of the photopolymerization initiator encompass a benzoin compound, a benzophenone compound, an acetophenone compound, an acylphosphine oxide compound, a triazine compound, an iodonium salt, and a sulfonium salt.

Examples of the benzoin compound encompass benzoin, benzoin methyl ether, benzoin ethyl ether, benzoin isopropyl ether, and benzoin isobutyl ether.

Examples of the benzophenone compound encompass benzophenone, methyl o-benzoylbenzoate, 4-phenylbenzophenone, 4-benzoyl-4'-methyldiphenyl sulfide, 3,3',4,4'-tetra (tert-butylperoxy carbonyl)benzophenone, and 2,4,6-trimethylbenzophenone.

Examples of the acetophenone compound encompass oligomers of α,α-diethoxyacetophenone, 2-methyl-2-morpholino-1-(4-methylthiophenyl)propane-1-one, 2-benzyl-2-dimethylamino-1-(4-morpholinophenyl)butane-1-one, 2-hydroxy-2-methyl-1-phenylpropane-1-one, 1,2-diphenyl-2,2-dimethoxy-1-ethanone, 2-hydroxy-2-methyl-1-[4-(2-hydroxyethoxy)phenyl]propane-1-one, 1-hydroxycyclohexyl phenyl ketone, and 2-hydroxy-2-methyl-1-[4-(1-methyl vinyl)phenyl]propane-1-one.

Examples of the acyl phosphine oxide compound encompass a 2,4,6-trimethylbenzoyl diphenylphosphine oxide and a bis(2,4,6-trimethyl benzoyl)phenylphosphine oxide.

Examples of the triazine compound encompass 2,4-bis(trichloromethyl)-6-(4-methoxyphenyl)-1,3,5-triazine, 2,4-bis(trichloromethyl)-6-(4-methoxy naphthyl)-1,3,5-triazine, 2,4-bis(trichloromethyl)-6-(4-methoxy styryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine, and 2,4-bis(trichloromethyl)-6-[2-(3,4-dimethoxyphenyl)ethenyl]-1,3,5-triazine.

Examples of the photopolymerization initiator encompass commercially available photopolymerization initiators such as (i) Irgacure (Registered Trademark) 907, Irgacure 184, Irgacure 651, Irgacure 819, Irgacure 250, and Irgacure 369 (each manufactured by BASF Corp.), (ii) SEIKUOL BZ, SEIKUOL Z and SEIKUOL BEE (each manufactured by Seiko Chemical Co., Ltd.), (iii) Kayacure BP100 (manufactured by Nippon Kayaku Co., Ltd.), (iv) Kayacure UVI-6992 (manufactured by The Dow Chemical Company), (v) ADEKA OPTOMER SP-152 and ADEKA OPTOMER SP-170 (each manufactured by ADEKA CORPORATION), (vi) TAZ-A and TAZ-PP (each manufactured by NIHON SIBER HEGNER K.K.), and (vii) TAZ-104 (manufactured by SANWA CHEMICAL CO., LTD.).

An amount of polymerization initiator contained in the composition of the present invention relative to 100 parts by mass of the liquid crystal composition contained in the composition of the present invention is 0.1 parts by mass to 30 parts by mass, and preferably 0.5 parts by mass to 10 parts by mass. In a case where the amount of polymerization initiator contained falls within these ranges, a compound constituting the liquid crystal composition can be polymerized without disturbing alignment of the liquid crystal compound contained in the composition of the present invention.

The composition of the present invention can contain a photosensitizer. Examples of the photosensitizer encompass xanthone compounds such as xanthone and thioxanthone (e.g. 2,4-diethyl thioxanthone, 2-isopropyl thioxanthone, etc.); anthracene compounds having substituents such as anthracene and alkoxy groups (e.g. dibutoxyanthracene); phenothiazine; and rubrene.

Use of the photosensitizer allows a compound constituting the liquid crystal composition contained in the composition of the present invention to be polymerized with high sensitivity, and therefore allows an optical film, which can be obtained as a result of thus polymerizing the compound, to be increasingly stable over time. An amount of the photosensitizer contained relative to 100 parts by mass of the liquid crystal composition of the present invention is 0.1 parts by mass to 30 parts by mass, and preferably 0.5 parts by mass to 10 parts by mass. In a case where the amount of the photosensitizer contained falls within these ranges, the compound constituting the liquid crystal composition can be polymerized without disturbing an alignment property of the liquid crystal compound contained in the composition of the present invention.

The composition of the present invention can further contain a polymerization inhibitor. Examples of the polymerization inhibitor encompass: a hydrochinone compound having a substituent such as hydrochinone or an alkoxy group; a catechol compound having a substituent such as an alkyl group such as butylcatechol; a pyrogallol compound; a radical capture agent such as 2,2,6,6-tetramethyl-1-piperidinyloxy radical; a thiophenol compound; a β-naphthylamine compound; and a β-naphthol compound.

In a case where a polymerization inhibitor is used, polymerization of a compound constituting the liquid crystal composition contained in the composition of the present invention can be easily controlled. This allows an increase in stability of an optical film to be obtained. An amount of a polymerization inhibitor contained relative to 100 parts by mass of the liquid crystal composition contained in the composition of the present invention is 0.1 parts by mass to 30 parts by mass, and preferably 0.5 parts by mass to 10 parts by mass. In a case where the amount of polymerization inhibitor contained falls within these ranges, the compound constituting the liquid crystal composition contained in the composition of the present invention can be polymerized without disturbing alignment of the liquid crystal compound contained in the composition of the present invention.

The composition of the present invention can further contain a leveling agent. Examples of the leveling agent encompass: radiation curable coating additives (manufactured by BYK Japan KK: BYK-352, BYK-353, BYK-361N); coating additives (manufactured by Dow Corning Toray Co., Ltd.: SH28PA, DC11PA, ST80PA); coating additives (manufactured by Shin-Etsu Chemical Co., Ltd.: KP321, KP323, X22-161A, KF6001); and fluorine-based additives (manufactured by DIC Corporation: F-445, F-470, F-479).

In a case where a leveling agent is used, it is possible to obtain a smoother optical film. In addition, during production of the optical film, it is possible to (i) control fluidity of the composition of the present invention and (ii) adjust a crosslinking density of the optical film to be obtained. A specific numerical value of the leveling agent used relative to 100 parts by mass of the liquid crystal composition contained in the composition of the present invention is 0.01 parts by mass to 30 parts by mass, and preferably 0.05 parts by mass to 10 parts by mass. In a case where the amount of leveling agent contained falls within these ranges, the compound constituting the liquid crystal composition contained in the composition of the present invention can be polymerized without disturbing alignment of the liquid crystal compound contained in the composition of the present invention.

In view of fluidity, the composition of the present invention preferably contains an organic solvent. The organic solvent only needs to be (i) an organic solvent which can dissolve the compound and the liquid crystal compound which are contained in the composition of the present invention and (ii) a solvent which is inactive in a polymerization reaction. Specific examples of the organic solvent encompass: alcohol solvents such as methanol, ethanol, ethylene glycol, isopropyl alcohol, propylene glycol, ethylene glycol methyl ether, and ethylene glycol butyl ether; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, 2-heptanone, and methyl isobutyl ketone; non-chlorinated aliphatic hydrocarbon solvents such as pentane, hexane, and heptane; non-chlorinated aromatic hydrocarbon solvents such as toluene, xylene, and phenol; nitrile solvents such as acetonitrile; ether solvents such as propylene glycol monomethyl ether, tetrahydrofuran, and dimethoxyethane; chlorinated hydrocarbon solvents such as chloroform and chlorobenzene; and phenol. These organic solvents can be used individually, or two or more of these organic solvents can be used in combination. In particular, the composition of the present invention and the compound contained in the composition of the present invention are highly compatible and can be dissolved in an alcohol solvent, an ester solvent, a ketone solvent, a non-chlorinated aliphatic hydrocarbon solvent, and a non-chlorinated aromatic hydrocarbon solvent. This allows a film to be formed without using a chlorinated hydrocarbon solvent such as chloroform.

An amount of the organic solvent contained relative to 100 parts by mass of the liquid crystal composition contained in the composition of the present invention is 10 parts by mass to 10,000 parts by mass, and preferably 100 parts by mass to 5,000 parts by mass.

In a case where the composition of the present invention contains an organic solvent, a viscosity of the organic solvent is 0.1 mPa·s to 10 mPa·s, and preferably 0.1 mPa·s to 7 mPa·s from the viewpoint that an optical film tends to be less likely to be uneven in thickness.

A solid content concentration in the composition of the present invention is 2 mass % to 50 mass %, and preferably 5 mass % to 50 mass %. In a case where the solid content concentration is equal to or less than 50 mass %, the composition is prevented from having an excessively low viscosity. This tends to cause an optical film to be less likely to be uneven in thickness. Note that a solid content herein refers to a component obtained by removing an organic solvent from the composition of the present invention.

The composition of the present invention preferably further contains a dichroic dye. A polarizing film can be prepared by (i) applying the composition of the present invention, which contains a dichroic dye, to a base material and (ii) polymerizing the composition.

Note that a dichroic dye refers to a dye having a property in which an absorbance varies between a longer axis direction and a shorter axis direction of a molecule. The dichroic dye preferably has a property to absorb visible light, and more preferably has a property in which an absorption maximum wavelength (λMAX) falls within a range of 380 nm to 680 nm. Examples of such a dichroic dye encompass acridine dye, oxazine dye, cyanine dye, naphthalene dye, azo dye, and anthraquinone dye. Among these dyes, azo dye is preferable. Examples of the azo dye encompass monoazo dye, bisazo dye, trisazo dye, tetrakisazo dye, and stilbene azo dye. Among these dyes, bisazo dye, and trisazo dye are preferable. These dichroic dyes can be used individually or in combination. Meanwhile, in order to absorb visible light in an entire visible light range, it is preferable to use three or more types of dichroic dyes in combination, and it is more preferable to use three or more types of azo dyes in combination.

Examples of a preferable dichroic dye encompass the compound represented by the following formula (3-1):

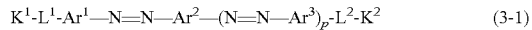

(3-1)

wherein: $K^1$ and $K^2$ each independently represent a functional group selected from the group consisting of a C1-C12 chain alkyl group, a C5-C6 cyclic alkyl group, an N-piperidinyl group, an N-piperazinyl group, an N-pyrrolidinyl group, an N-morpholinyl group, an N,N-diethylamino group, a cyano group, and a sulfonylmethyl group;

$L^1$ and $L^2$ each independently represent a single bond or a bivalent linking group; and $Ar^1$ through $Ar^3$ each independently represent (i) a substituted or unsubstituted 1,4-phenylene group, (ii) a substituted or unsubstituted naphthalene-1,4-diyl group, or (iii) a bivalent heterocyclic group which can have a substituent; and p represents an integer selected from 0 to 2.

The composition of the present invention preferable contains, as a dichroic dye, the compound represented by the formula (3-1) from the viewpoint that an optical film to be obtained from the composition of the present invention can show a high dichroic ratio.

In a case where $K^1$ or $K^2$ is a C1-C12 chain alkyl group, examples of the C1-C12 chain alkyl group encompass a methyl group, a trifluoromethyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an isopropyl group, an isobutyl group, a sec-butyl group, a tert-butyl group, a 2-ethylhexyl group, and a 2-methylbutyl group. Among these groups, a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, and an n-dodecyl group are preferable because each of these allows the dichroic dye to have excellent dichroism. A methyl group, an n-propyl group, an n-butyl group, an n-pentyl group, and an n-hexyl group are more preferable because each of these allows the dichroic dye to have excellent solubility and to be easily purified.

In a case where $K^1$ or $K^2$ is a cyclic alkyl group, examples of the cyclic alkyl group encompass a cyclohexyl group, a cyclohexenyl group, a cyclopentyl group, a cyclopentadienyl group, and a cyclohexadienyl group. Among these groups, a cyclohexyl group is particularly preferable because a cyclohexyl group allows the dichroic dye to be easily synthesized.

It is still more preferable that $K^1$ and $K^2$ are each independently, of the groups listed above, a trifluoromethyl group, an n-propyl group, an n-butyl group, an n-pentyl group, an n-hexyl group, an N-piperidinyl group, an N-piperazinyl group, an N-pyrrolidinyl group, an N-morpholinyl group, an N,N-diethylamino group, a cyano group, or a sulfonylmethyl group because these groups do not impair alignment of higher-order smectic liquid crystals.

Examples of $L^1$ and $L^2$ each independently as a bivalent linking group encompass a single bond, —C(=O)—, —O—, —S—, —CO—O—, —O—CO—, —O—CO—O—, —C(=S)—O—, —O—C(=S)—, —O—C(=S)—O—, —CO—NR$^{11}$—, —NR$^{11}$—CO—, —O—CH$_2$—, —CH$_2$—O—, —S—CH$_2$—, —CH$_2$—S—, —NR$^{11}$—, and —CR$^9$=CR$^{10}$—. Note that (i) $R^9$ and $R^{10}$ each independently represent hydrogen or a methyl group and (ii) $R^{11}$ represents hydrogen, a methyl group, or an ethyl group. It is more preferable that $L^1$ and $L^2$ each independently as a bivalent linking group is a single bond, —C(=O)—, —O—, or —S— because these bivalent linking groups each allow the dichroic dye to be easily synthesized.

$Ar^1$ through $Ar^3$ each independently represent (i) a substituted or unsubstituted 1,4-phenylene group, (ii) a substituted or unsubstituted naphthalene-1,4-diyl group, or (iii) a bivalent heterocyclic group which can have a substituent. $A^1$ and/or $A^2$ can be a 1,4-phenylene group.

Examples of a substituent of each of a 1,4-phenylene group, a naphthalene-1,4-diyl group, and a bivalent heterocyclic group, each of which is any one of $Ar^1$ through $Ar^3$, encompass: C1-4 alkyl groups such as a methyl group, an ethyl group, and a butyl group; C1-4 alkoxy groups such as a methoxy group, an ethoxy group, and a butoxy group; C1-4 fluorinated alkyl groups such as a trifluoromethyl group; cyano groups; nitro groups; halogen atoms such as a chlorine atom and a fluorine atom; and substituted or unsubstituted amino groups such as an amino group, a diethylamino group, and a pyrrolidino group. Note that a substituted amino group refers to (i) an amino group having one C1-6 alkyl group or two C1-6 alkyl groups or (ii) an amino group forming a C2-8 alkanediyl group by two substituted alkyl groups bonding to each other. Examples of the C1-6 alkyl group encompass a methyl group, an ethyl group, and a hexyl group. Examples of the C2-8 alkanediyl group encompass an ethylene group, a propane-1,3-diyl group, a, butane-1,3-diyl group, a butane-1,4-diyl group, a pentane-1,5-diyl group, a hexane-1,6-diyl group, a heptane-1,7-diyl group, and an octane-1,8-diyl group. From the viewpoint of dispersing the dichroic dye into a highly-ordered liquid crystal structure such as smectic liquid crystals, it is preferable that $Ar^1$ through $Ar^3$ each independently represent (i) an unsubstituted 1,4-phenylene group, (ii) a 1,4-phenylene group in which hydrogen is substituted by a methyl group or a methoxy group, or (iii) a bivalent heterocyclic group. In addition, p is preferably selected from 0 to 2. Among these, the compound represented by the formula (3-1) is preferably a compound represented by the formula (3-2) in which the p of the formula (3-1) is 1. The compound represented by the formula (3-2) is preferably configured so that at least two of Ar¹ through Ar³ are 1,4-phenylene groups because, in such a case, molecular synthesis is made easy as well as high performance is achieved.

$$K^1\text{-}L^1\text{-}Ar^1\text{—}N\text{=}N\text{—}Ar^2\text{—}N\text{=}N\text{—}Ar^3\text{-}L^2\text{-}K^2 \quad (3\text{-}2)$$

wherein $K^1$, $K^2$, $L^1$, $L^2$, $Ar^1$, $Ar^2$, and $Ar^3$ are same as those of the formula (3-1).

Suitable examples of the bivalent heterocyclic group encompass groups represented by the following formulas (Ar-1) through (Ar-22). Note that broken lines shown in the formulas (Ar-1) through (Ar-22) each represent a location at which to connect to another group.

[Chem. 2]

From the viewpoint of ease of synthesis of the dichroic dye, it is more preferable that $Ar^1$ through $Ar^3$ are each independently a phenyl group or a group represented by a formula (Ar-1), a formula (Ar-2), a formula (Ar-9), a formula (Ar-10), a formula (Ar-11), or a formula (Ar-12). $Ar^1$ through $Ar^3$ are each more preferably a phenyl group or a group represented by the formula (Ar-11) or formula (Ar-12) from the viewpoint that these groups allow the dichroic dye to have excellent dichroism.

In a case where $A^2$ is a bivalent heterocyclic group, the bivalent heterocyclic group is preferably a heterocyclic group in which $A^2$ and a group adjacent to $A^2$ make a molecular bonding angle of substantially 180°, and is more preferably a heterocyclic group in which two five-membered rings are condensed. Specifically, examples of the heterocyclic group encompass groups represented by the formulas (Ar-1) through (Ar-3), the formula (Ar-3), the formula (Ar-8), the formula (Ar-9), the formula (Ar-10), the formula (Ar-11), the formula (Ar-12), the formula (Ar-13), the formula (Ar-14), the formula (Ar-15), the formula (Ar-16), and the formula (Ar-17).

It is preferable that at least one of $Ar^1$ through $Ar^3$ is a group represented by the formula (Ar-8) or the formula (Ar-11) from the viewpoint that an optical film to be obtained from the composition of the present invention can absorb light having a long wavelength.

It is preferable that each of $Ar^1$ through $Ar^3$ preferably has no unsubstituted group, and it is more preferable that at least $Ar^2$ has no substituted group because, in such cases, the dichroic dye has excellent dichroism.

An amount of the dichroic dye used relative to 100 parts by mass of the liquid crystal composition is 0.01 parts by mass to 30 parts by mass, and preferably 0.05 parts by mass to 10 parts by mass. In a case where the amount of the dichroic dye used falls within these ranges, the compound constituting the liquid crystal composition contained in the composition of the present invention can be polymerized without disturbing alignment of the liquid crystal compound contained in the composition of the present invention. In a case where the amount of the dichroic dye contained is excessively small, light absorption becomes insufficient. This prevents sufficient polarizability from being obtained. In a case where the amount of the dichroic dye contained is excessively large, an alignment of liquid crystal molecules may be inhibited.

Depending on the purpose of the use of the dichroic dye, it is possible to mix several kinds of dichroic dyes.

Specific examples of dichroic dye that can be contained in the composition of the present invention encompass the following formulas (3-1-1) through (3-1-100):

[Chem. 3]

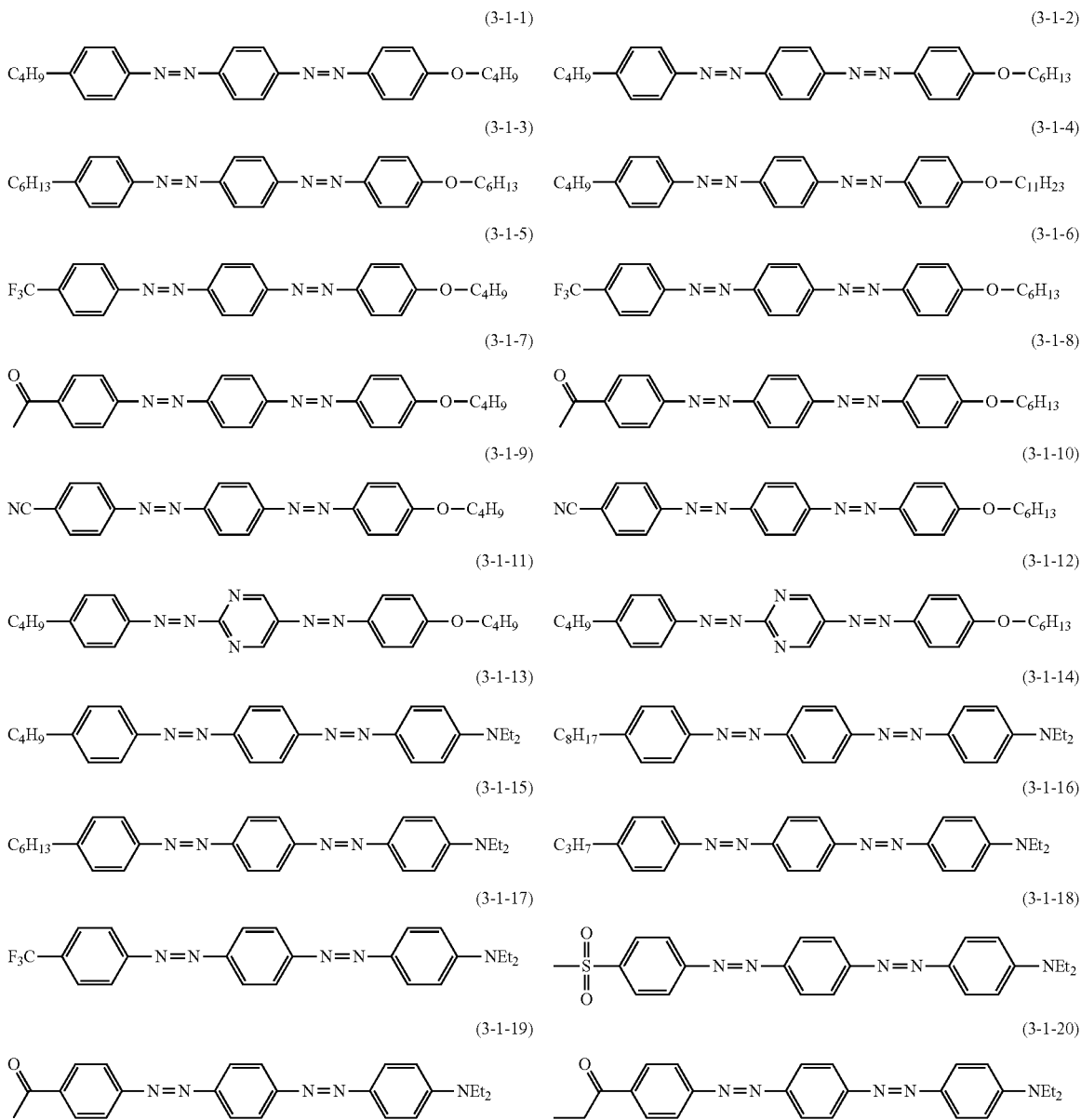

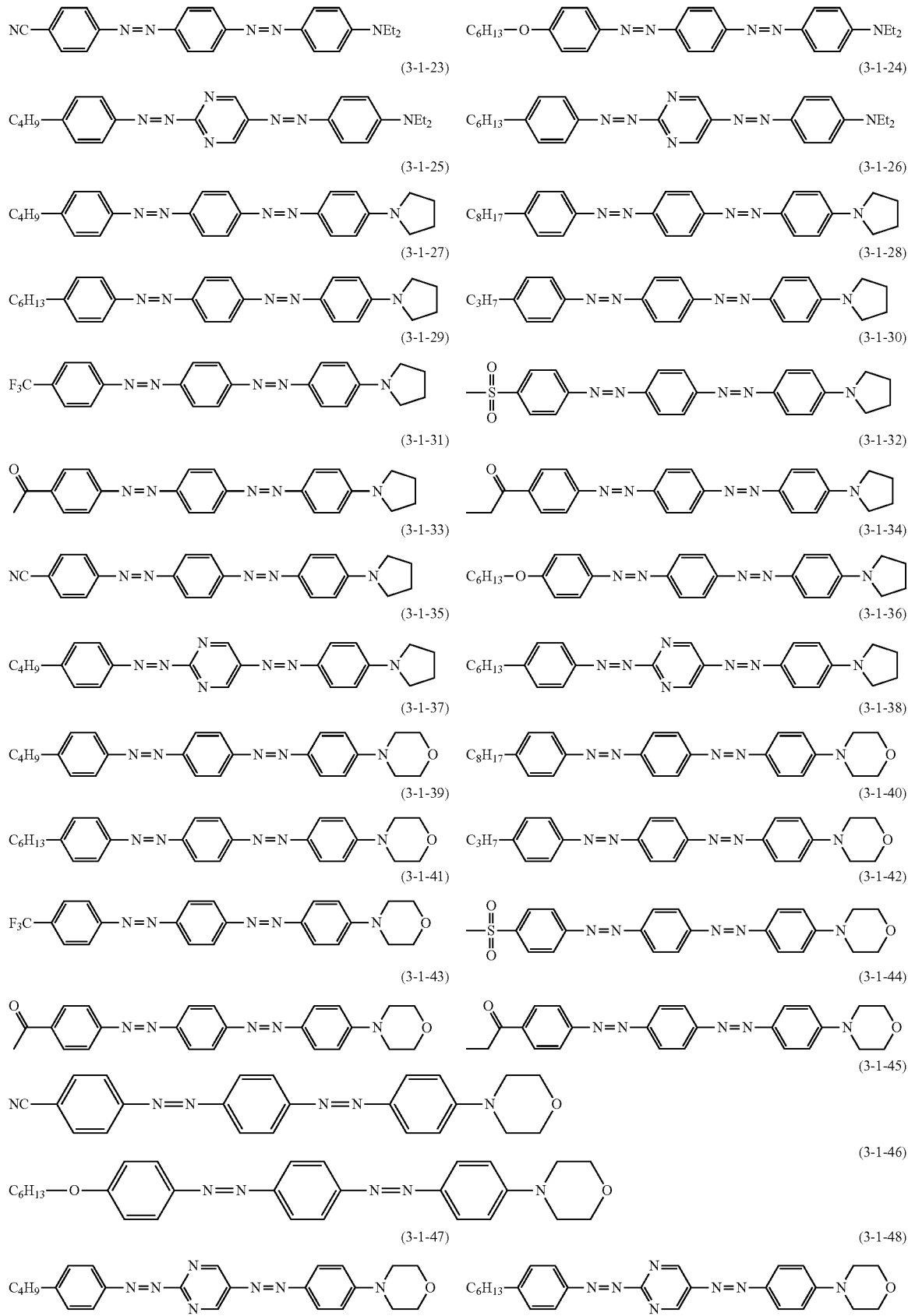

-continued
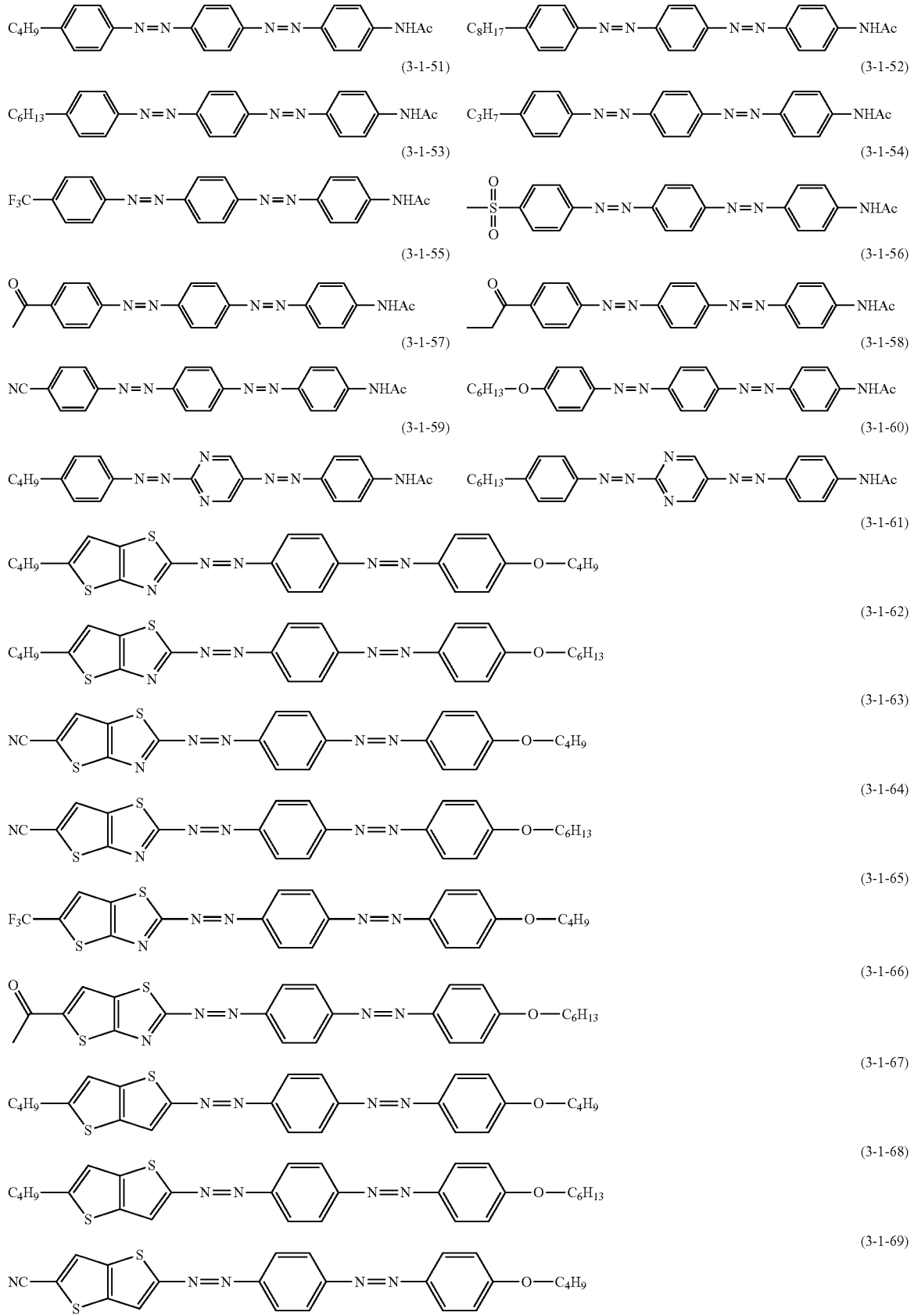

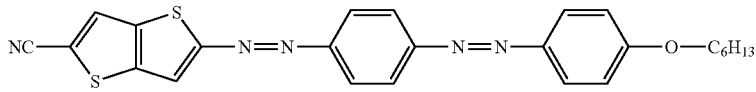
(3-1-70)
(3-1-71)
(3-1-72)
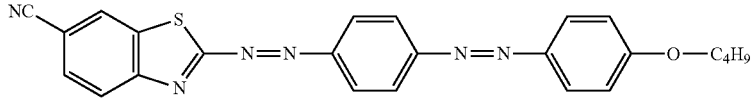
(3-1-73)
(3-1-74)
(3-1-75)
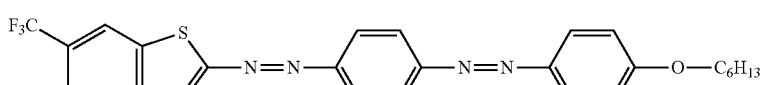
(3-1-76)
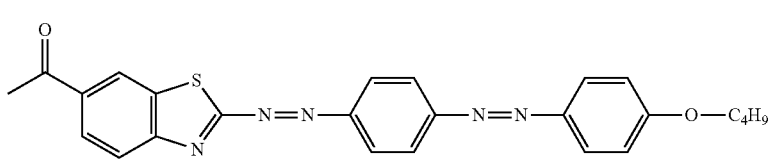
(3-1-77)
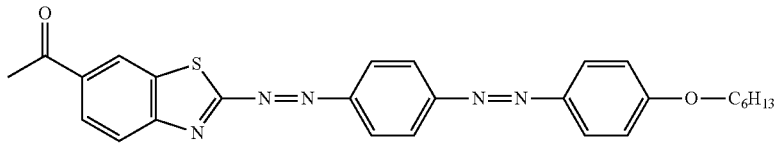
(3-1-78)
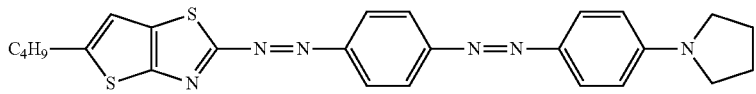
(3-1-79)
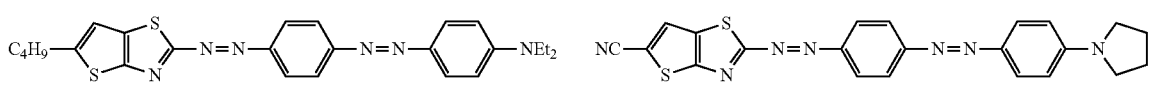
(3-1-80) (3-1-81)
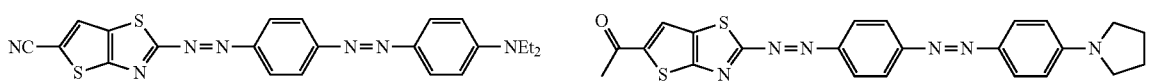
(3-1-82) (3-1-83)
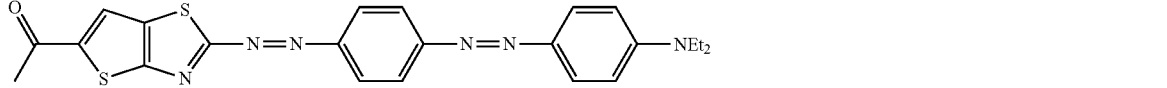
(3-1-84)
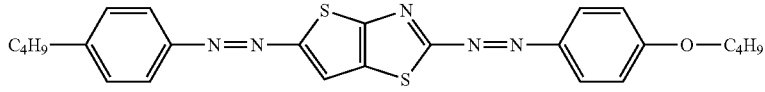
(3-1-85)

-continued
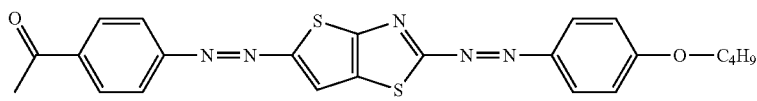
(3-1-86)
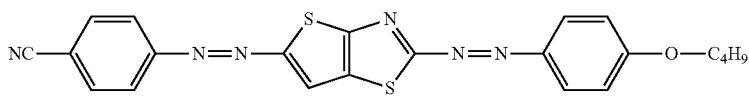
(3-1-87)
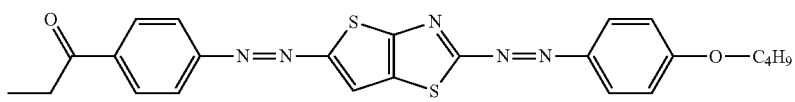
(3-1-88)
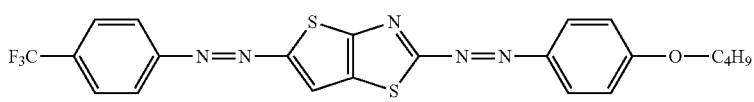
(3-1-89)
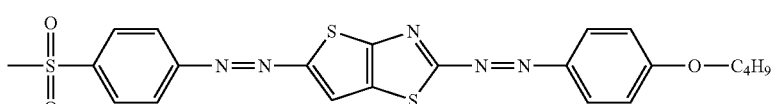
(3-1-90)
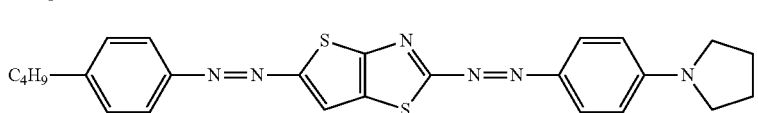
(3-1-91)
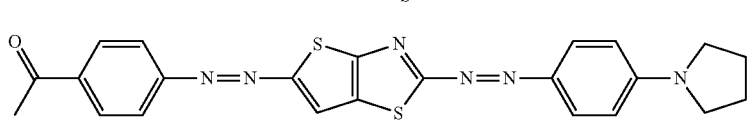
(3-1-92)
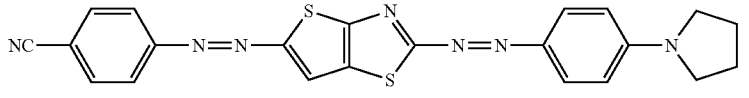
(3-1-93)
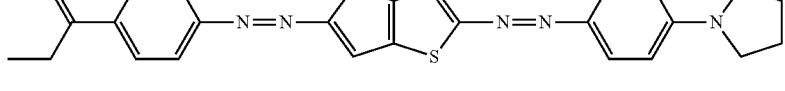
(3-1-94)
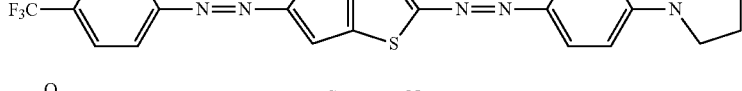
(3-1-95)
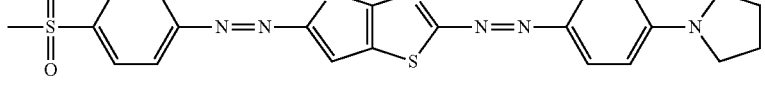
(3-1-96)
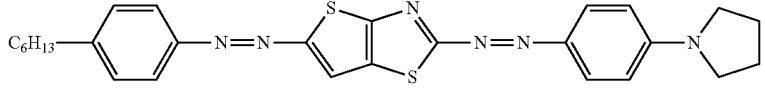
(3-1-97)
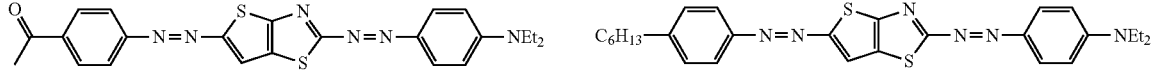
(3-1-98) (3-1-99)
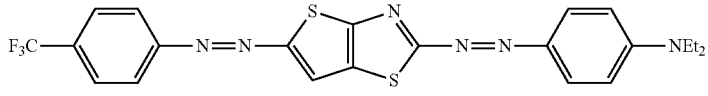
(3-1-100)

The anthraquinone dye is preferably a compound represented by the following formula (4-1).

[Chem. 4]

(4-1)

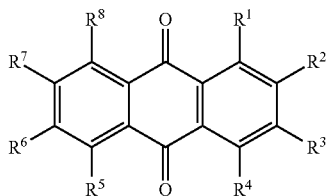

wherein (in the formula (4-1)):
$R^1$ through $R^8$ each independently represent a hydrogen atom, $-R^x$, $-NH_2$, $-NHR^x$, $-NR^x_2$, $-SR^x$, or a halogen atom; and
$R^x$ represents a C1-4 alkyl group or a C6-12 aryl group.

The oxazine dye is preferably a compound represented by the following formula (4-2):

[Chem. 5]

(4-2)

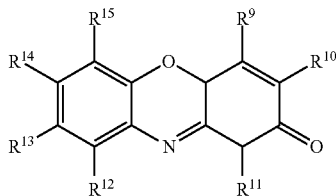

wherein (in the formula (4-2)):
$R^9$ through $R^{15}$ each independently represent a hydrogen atom, $-R^x$, $-NH_2$, $-NHR^x$, $-NR^x_2$, $-SR^x$, or a halogen atom; and
$R^x$ represents a C1-4 alkyl group or a C6-12 aryl group.

The acridine dye is preferably a compound represented by the following formula (4-3):

[Chem. 6]

(4-3)

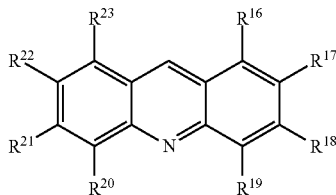

wherein (in the formula (4-3))):
$R^{16}$ through $R^{23}$ each independently represent a hydrogen atom, $-R^x$, $-NH_2$, $-NHR^x$, $-NR^x_2$, $-SR^x$, or a halogen atom; and
$R^x$ represents a C1-4 alkyl group or a C6-12 aryl group.

Examples of the C1-4 alkyl group represented by $R^x$ in each of the formulas (4-1), (4-2), and (4-3) encompass a methyl group, an ethyl group, a propyl group, butyl group, a pentyl group, and a hexyl group. Examples of the C6-12 aryl group represented by $R^x$ in each of the formulas (4-1), (4-2), and (4-3) encompass a phenyl group, a toluyl group, a xylyl group, and a naphthyl group.

The cyanine dye is preferably a compound represented by the following formula (4-4) or the following formula (4-5):

[Chem. 7]

(4-4)

wherein (in the formula (4-4)):
$D^1$ and $D^2$ each independently represent a group represented by any of the following formulas (4-4a) through (4-4d):

[Chem. 8]

(4-4a)

(4-4b)

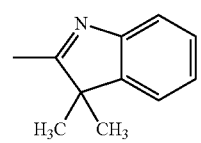

(4-4c)

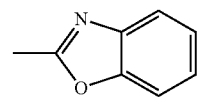

(4-4d)

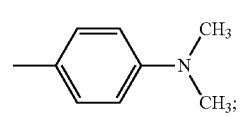

and
n5 represents an integer selected from 1 to 3.

[Chem. 9]

(4-5)

wherein (in the formula (4-5)):
$D^3$ and $D^4$ each independently represent a group represented by any one of the following formulas (4-5a) through (4-5h):

[Chem. 10]

(4-5a)

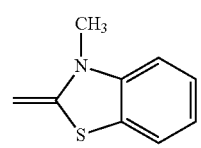

(4-5b)

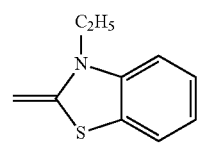

-continued (4-5c)
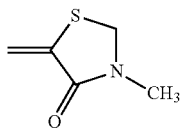

(4-5d)
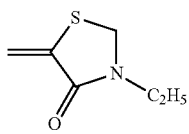

(4-5e)
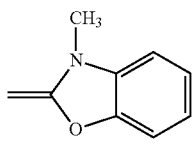

(4-5f)
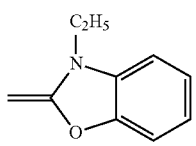

(4-5g)
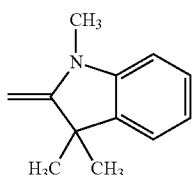

(4-5h)
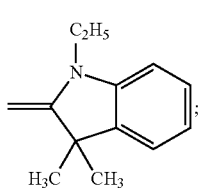

and n6 represents an integer selected from 1 to 3.

A method of synthesizing the liquid crystal composition which can be contained in the composition of the present invention is not limited to any particular one. Examples of a method of producing a liquid crystal composition including Compounds (1-1) and (2-1) will be described below.

Compounds (1-1) and (2-1) are each produced by (i) subjecting a compound, which is represented by the following formula (5-1) (hereinafter also referred to as "Compound (5-1)"), to catalytic hydrogenation and then (ii) filtering a reaction solution so as to obtain, as an intermediate, a compound represented by the following formula (6-1) (hereinafter also referred to as "Compound (6-1)").

[Chem. 11]

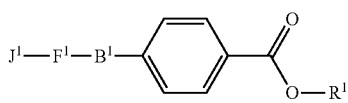
(5-1)

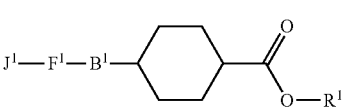
(6-1)

wherein (in each of the formulas (5-1) and (6-1)):

$B^1$ and $F^1$ represent the respective groups as described earlier;

$J^1$ represents a group identical to that represented by $P^1$, or represents a functional group for bonding $P^1$ (Examples of the functional group for bonding $P^1$ encompass a hydroxyl group and an amino group. Among these, a hydroxyl group does not impair a reduction reaction, and is therefore more preferable); and $R^1$ represents a methyl group or an ethyl group.

Examples of a catalyst for use in the catalytic hydrogenation encompass a palladium catalyst, a ruthenium catalyst, a platinum catalyst, a nickel catalyst, and a rhodium catalyst. Among these catalysts, a palladium catalyst, a platinum catalyst, a ruthenium catalyst, and a rhodium catalyst are preferable because these catalysts each allow an aromatic ring to be easily hydrogenated. A ruthenium catalyst is inexpensive, and is therefore particularly preferable.

The catalyst for use in the catalytic hydrogenation is preferably a catalyst which is supported on, for example, carbon, alumina, or silica. In addition the catalyst for use in the catalytic hydrogenation preferably contains a water component because a catalyst containing moisture can be safely handled. Furthermore, the catalyst for use in the catalytic hydrogenation is particularly preferably a ruthenium-carbon catalyst because a ruthenium-carbon catalyst has excellent reaction activity.

Examples of a solvent for use in the catalytic hydrogenation encompass methanol, ethanol, isopropanol, tetrahydrofuran, and methylcyclohexane. Among these solvents, tetrahydrofuran and methylcyclohexane generate little side reaction, and are therefore more preferable. In addition, methylcyclohexane can be handled safely as a compound, and is therefore particularly preferable.

An amount of the solvent to be used relative to 100 parts by mass of Compound (5-1) is preferably equal to or more than 100 parts by mass. The amount is particularly preferably equal to or more than 150 parts by mass and equal to or less than 600 parts by mass because, with this range, (i) a reaction vessel has high volume efficiency and (ii) the solvent can easily be removed.

Furthermore, the solvent can contain an acid, examples of which encompass an acetic acid, a formic acid, and hydrochloric acid.

The catalytic hydrogenation is preferably carried out under a hydrogen pressure of 1 MPa to 15 MPa. The hydrogen pressure is more preferably 1 MPa to 10 MPa because, with this range, there is little side reaction. The hydrogen pressure is particularly preferably 4 MPa to 10 MPa because, with this range, a reaction yield is high. A suitable reaction temperature in the catalytic hydrogenation is 50° C. to 200° C. Of the range of temperatures, 50° C. to 120° C. is preferable because, with this range, there is little side reaction, and 70° C. to 120° C. is particularly preferable because, with this range, a reaction speed is high.

Compound (6-1), which is a cis-trans mixture, is ordinarily produced so that a cis isomer is greater in amount than a trans isomer. Then, it is possible to separate the mixture by column chromatography and use a cis isomer or a trans isomer. Alternatively, it is possible to use a trans isomer obtained with high yield by carrying out an isomerizing step (described below) so as to carry out the following simultaneously: (i) saponification of Compound (6-1) and (ii) isomerization of the cis isomer into a trans isomer.

The isomerizing step is carried out by, for example, heating under a basic condition. Specific examples of the isomerizing step encompass a step in which heating is carried out by adding an organic base or an inorganic base to Compound (6-1) in an organic solvent. In so doing, hydrolysis of an ester bond occurs, so that Compound (7-1) and Compound (7-2) are generated. Since a cis-trans isomerization reaction is a reversible reaction, a cis-trans isomer is generated in a constant ratio which is decided thermodynamically. Alternatively, by a method such as deposition of a trans isomer from a solvent, it is possible to proceed an isomerization reaction until a trans isomer content is approximately equal to or more than 90%.

[Chem. 12]

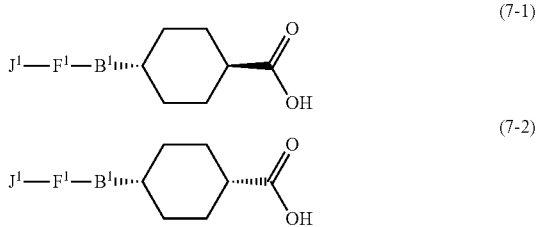

wherein (in each of the formulas (7-1) and (7-2)):

$B^1$, $F^1$, and $J^1$ represent the respective groups as described earlier.

The organic solvent preferably contains a solvent including, but not limited to, an aromatic solvent. Examples of the aromatic solvent encompass benzene, toluene, xylene (ortho-xylene, meta-xylene, para-xylene, or mixture of these), mesitylene, cymene, cumene, durene, chlorobenzene, diphenyl ether, anisole, thioanisole, dichlorobenzene, and bromobenzene. Among these aromatic solvents, ortho-xylene, mesitylene, cymene, cumene, durene, diphenyl ether, and anisole are preferable. These aromatic solvents can be used individually, or two or more of these aromatic solvents can be used in combination.

The base for use in the isomerization is preferably an inorganic base because an organic base causes a side reaction to easily occur and makes it difficult for a salt of Compound (7-1) to be a solid. Examples of the inorganic base encompass lithium hydroxide, sodium hydroxide, potassium hydroxide, cesium hydroxide, sodium hydride, potassium hydride, and calcium hydride. Among these inorganic bases, potassium hydroxide and cesium hydroxide are preferable.

Since the inorganic base is brought into reaction in a solvent, a reaction solution becomes non-uniform. An effective way of increasing a reaction speed of the isomerization reaction is to increase a surface area of the inorganic base. Therefore, for example, it is possible to crush a pellet of the inorganic base and use a crushed pellet, or to add water to a pellet of the inorganic base to dissolve the pellet so that a two-layer reaction solution made up of the inorganic solvent and an organic solvent is obtained. Alternatively, it is possible to add a phase transfer catalyst except for a polymer (e.g. polyethylene glycol) which has a crown ether or an oxyethylene unit. (A crown ether is not suitable as a phase transfer catalyst from the viewpoint of hazardousness. An ethylene glycol-based polymer is not suitable as a phase transfer catalyst from the viewpoint that an ethylene glycol-based polymer causes a salt of Compound (7-1) to be extracted into a solvent, so that an isomerization reaction (reverse reaction) of trans into cis occurs.) Examples of such a phase transfer catalyst encompass a tetra-alkyl ammonium salt. A tetrabutylammonium salt is particularly preferable.

It is preferable that equal to or more than 1.1 molar equivalents of the base is added to 1 mol of Compound (5-1). In a case where the base is extracted as a carboxylic acid after a reaction, a neutralization reaction is necessary. Therefore, an amount of the base to be added is preferably equal to or more than 1.1 molar equivalents and equal to or less than 3 molar equivalents, and particularly preferably equal to or more than 1.1 molar equivalents and equal to or less than 2 molar equivalents.

A reaction temperature of the isomerization reaction only needs to be, in theory, equal to or more than a temperature at which alcohol ($R^1$—OH) to be generated by hydrolysis is evaporated. However, due to an advantage in proceeding of isomerization, the reaction temperature, in terms of an internal temperature at the time when the reaction stops, is preferably equal to or more than 80° C., more preferably equal to or more than 120° C., and particularly preferably equal to or more than 120° C. and equal to or less than 170° C. This particularly preferable range is realistic equipment-wise.

Compound (5-1), which is to be a raw material of an optical film, ordinarily contains a solvent used in the catalytic hydrogenation step. In addition, alcohol ($R^1$—OH) is ordinarily generated in the process by use of an inorganic base. Therefore, from the viewpoint of safety, heating is preferably carried out in stages. As a first heating step, in particular, a step of carrying out a heat treatment at a temperature equal to or more than 80° C. and equal to or less than 120° C. is preferable. After the alcohol is sufficiently removed, the isomerization reaction is further proceeded. Therefore, as a second heating step, a step of carrying out a heat treatment at a temperature equal to or more than 120° C. and equal to or less than 170° C. is more preferable.

A reaction time of the isomerization reaction is preferably 1 minute to 24 hours, more preferably 1 hour to 12 hours, and particularly preferably 1 hour to 10 hours.

A trans isomer obtained in the isomerizing step is precipitated as a salt. In order to extract Compound (7-1) from a reaction solution in the isomerizing step, it is only necessary to carry out the following purifying process.

There are two purification methods. A first purification method is carried out such that (i) a salt of Compound (7-1) deposited from the reaction solution is filtered, (ii) the salt is dispersed into water and then subjected to neutralization, so that a solid is deposited, (iii) the solid is filtered, (iv) a filtered solid is washed with the use of an organic solvent, and (v) a remaining cis isomer is removed.

In the neutralization, an inorganic acid such as a hydrochloric acid or a sulfuric acid is suitably used.

Examples of the organic solvent encompass: (i) aromatic solvents such as toluene, xylene, and benzene; (ii) aliphatic saturated hydrocarbon solvents such as n-heptane, n-hexane, n-pentane, and n-octane; (iii) halogen solvents such as chloroform, dichloromethane, trichloroethane, and chlorobenzene. A mixed solvent can be obtained by mixing a plurality of these solvents, or by mixing a good solvent of Compound (7-1) with an aliphatic saturated hydrocarbon solvent such as n-hexane, n-pentane, or n-octane.

Examples of the good solvent of Compound (7-1) encompass: (i) ester solvents such as ethyl acetate, butyl acetate, and ethyl lactate; (ii) ether solvents such as diethyl ether and tetrahydrofuran; (iii) halogen solvents such as chloroform, dichloromethane, and trichloroethane, and (iv) ketone solvents such as methyl isobutyl ketone and methyl ethyl ketone. Among these solvents, ester solvents and halogen solvents are preferable because these solvents are highly stable in an acid and are easily distillable. Among these, ester solvents are particularly preferable.

More preferable examples of a washing solvent encompass: a mixed solvent of an aromatic solvent and an aliphatic saturated hydrocarbon solvent; a mixed solvent of a halogen solvent and an aliphatic saturated hydrocarbon solvent; and a mixed solvent of an ester solvent and an aliphatic saturated hydrocarbon solvent, because these mixed solvents allow a compound to have high trans purity and high yield. From the viewpoint of environmental compatibility, particularly preferable washing solvents are: a mixed solvent of an aromatic solvent and an aliphatic saturated hydrocarbon solvent; and a mixed solvent of an ester solvent and an aliphatic saturated hydrocarbon solvent.

A second purification method is carried out such that (i) the good solvent and water are added to a reaction solution followed by neutralization, (ii) an organic layer, which contains Compound (7-1) that is a carboxylic acid derivative, is collected, (iii) the organic layer is crystallized with the use of a saturated hydrocarbon solvent which is a poor solvent, and then (iv) a crystallized organic layer is filtered, so that Compound (7-1) is extracted.

In the neutralization, an inorganic acid such as a hydrochloric acid or a sulfuric acid is suitably used. Since Compound (7-1) has low solubility in an aromatic solvent, it is possible to add, as necessary, a good solvent before or during the neutralization so as to separate a salt from water and remove the salt. The neutralization is more preferable carried out after a good solvent and water are added.

Examples of the poor solvent to be used in the second purification method encompass: (i) cyclic saturated hydrocarbon solvents such as cyclohexane and methylcyclohexane and (ii) aliphatic saturated hydrocarbon solvents such as n-heptane, n-hexane, n-pentane, and n-octane. Among these solvents, aliphatic saturated hydrocarbon solvents are preferable, and n-heptane is particularly preferable.

The second purification method is preferable to the first purification method because the second purification method allows a highly pure Compound (7-1) to be obtained and allows for excellent filterability.

Alternatively, it is possible to that a filtrate, which is generated during the crystallization in the second purification method, is collected so as to be reused for another isomerizing step.

The filtrate generated during the crystallization contains Compound (7-1) and Compound (7-2). It is possible to subject the filtrate to vacuum concentration and then to carry out the isomerizing step again. Alternatively, it is possible, without concentration, to add a solvent used in the isomerizing step, and then to distill away a poor solvent by heating.

Compound (1-1) can be obtained by making an esterification reaction or the like with the use of Compound (7-1) obtained by the above purification method. Compound (2-1) can be likewise obtained with the use of Compound (7-2).

The esterification reaction is suitably an esterification reaction in which a coupling reagent is used. Examples of the coupling reagent to be used in the esterification reaction encompass dicyclohexylcarbodiimide, 1-ethyl-3-(3-dimethylaminopropyl)carbodiimide, 1-ethyl-3-(3-dimethylaminopropyl)carbodiimide hydrochloride, bis(2,6-diisopropylphenyl)carbodiimide, bis(trimethylsilyl)carbodiimide, N,N'-diisopropylcarbodiimide, and 2,2'-carbonylbis-1H-imidazole.

Meanwhile, a liquid crystal composition, which includes Compound (1-1) and Compound (2-1) that can be contained in the composition of the present invention, can be produced by the following methods (A) through (D). The method (A) is carried out such that the liquid crystal composition is produced by, as described earlier, (i) separating Compound (7-1) and Compound (7-2) from each other, (ii) synthesizing Compound (1-1) and Compound (2-1) from Compound (7-1) and Compound (7-2), respectively, and (iii) mixing Compound (1-1) and Compound (2-1) together. Ordinarily, however, completely separating Compound (7-1) and Compound (7-2) from each other requires crystallization or washing more than once, and is therefore difficult.

In a case where the isomerizing step allows an obtained product including a cis isomer and a trans isomer to be configured so that the trans isomer is sufficiently greater in amount than the cis isomer, it is possible to use the method (B) which is carried out such that (i) a reaction of Compound (7-1) and Compound (7-2) without separation is proceeded, so that a mixture of Compound (1-1) and Compound (2-1) is obtained and then (ii) the mixture is used as the composition of the present invention. Alternatively, it is possible to use the method (C) which is carried out such that (i) crystallization of mixture of Compound (7-1) and Compound (7-2) is carried out so that an amount of Compound (7-1) contained in the mixture is greater than that before the crystallization, (ii) the mixture thus obtained is used to obtain a mixture of Compound (1-1) and Compound (2-1), and then (iii) the mixture of Compound (1-1) and Compound (2-1) thus obtained is used as the composition of the present invention. Alternatively, it is possible to use the method (D) which is carried out such that (i) a mixture of Compound (1-1) and Compound (2-1) is obtained and then (ii) the mixture is purified so as to adjust a mixing ratio between Compound (1-1) and Compound (2-1). In such a case, the mixing ratio of Compound (1-1) and Compound (2-1) can be suitably adjusted by mixing a plurality of lots having respective mixing ratios of Compound (1-1) and Compound (2-1).

In order to obtain the composition of the present invention, the method (B) and the method (C) are preferable from the viewpoint of yield and ease of steps involved.

The composition of the present invention can be obtained by adding, to the liquid crystal composition obtained by one of the methods above, any other additive (examples of which additive encompass a polymerization initiator, a photosensitizer, a polymerization inhibitor, a leveling agent, and an organic solvent).

[Embodiment 2: Optical Film]

An optical film of the present invention is formed by (i) a composition containing a smectic liquid crystal compound having a 1,4-cyclohexyl group or (ii) the above described liquid crystal composition. Specifically, the present invention can be (i) the composition containing the liquid crystal composition or (ii) an optical film containing the liquid crystal composition. In a case where the smectic liquid crystal compound, which is contained in the composition of the present invention or which constitutes the liquid crystal composition, and a geometrical isomer of the smectic liquid crystal compound each have a polymerizable group, the optical film of the present invention can be an optical film containing (i) a polymer of the smectic liquid crystal compound and (ii) a polymer of the geometrical isomer of the smectic liquid crystal compound.

The optical film can be obtained by curing a composition or a liquid crystal composition, in any of which a liquid crystal compound maintains a liquid crystalline state. Therefore, the optical film maintains a state in which the smectic liquid crystal compound having a 1,4-cyclohexyl group is aligned. The liquid crystalline state is preferably a smectic liquid crystal phase, and more preferably a higher-order smectic liquid crystal phase. Examples of the higher-order smectic liquid crystal phase encompass a smectic B phase, a smectic D phase, a smectic E phase, a smectic F phase, a smectic G phase, a smectic H phase, a smectic I phase, a smectic J phase, a smectic K phase, and a smectic L phase. Among these, a smectic B phase, a smectic F phase, and a smectic I phase are more preferable. By the liquid crystalline state of the liquid crystal compound, it is possible to obtain an optical film having a high orientation order. Note that such an optical film having a high orientation order shows a Bragg peak in X-ray reflection measurement. In a case where the optical film of the present invention is used as a polarizing film, the optical film can be a polarizing film in which (i) a Bragg peak is derived from a surface periodic structure of molecular orientation and (ii) a surface period of the structure is 3.0 Å to 5.0 Å.

A dichroic ratio of the optical film of the present invention is preferably equal to or more than 30, more preferably equal to or more than 40, and still more preferably equal to or more than 50. In a case where the dichroic ratio falls within these ranges, the optical film can be suitably used as a polarizing film.

In a case where (i) a composition forming an optical film contains, as a dichroic dye, a compound represented by the formula (3-1) and (ii) the compound represented by the formula (3-1) contains a thienothiazole group or a benzothiazole group as at least one of $Ar^1$ through $Ar^3$ in a molecule, the optical film to be obtained tends to absorb light having a long wavelength.

The optical film of the present invention can be produced by a method known to a person skilled in the art. In a case where a trans isomer and a cis isomer contained in the composition of the present invention serving as a raw material of the optical film each have a polymerizable group, examples of the method of producing the optical film encompass a method in which (i) the composition is applied to a substrate and then dried and then (ii) the composition is polymerized at a temperature which (a) falls within a range of temperatures at which the trans isomer contained in the composition exhibits a higher-order smectic liquid crystal phase and (b) is equal to or more than a crystal transition temperature of the trans isomer.

[Embodiment 3: Method of Producing Optical Film]

The present invention can be a method of producing an optical film, the method including the following steps (1) through (3):
(1) applying the composition of the present invention to a resin base material;
(2) heating the composition which has been thus applied to the base material; and
(3) cooling the composition, which has been thus heated, to a temperature equal to or less than 30° C. so as to subject the composition to smectic liquid crystal alignment.

In the step (1), a viscosity (fluidity) of the composition is preferably adjusted by, before applying the composition of the present invention applied to the resin base material, carrying out the step of, for example, dissolving the composition in an organic solvent. In a case where the viscosity of the composition is adjusted, the composition can be evenly applied to the resin base material. This makes it possible to cause unevenness in thickness of an optical film, which is to be obtained as a result, to be small.

In the step (1), a method of applying the composition of the present invention is not limited to any particular one. Examples of the method of applying the composition encompass a die coating method, a gravure method, a spin coating method, a flexographic printing method, and an inkjet method.

The step (2) can be carried out by heating the composition, which has been shaped into the form of a film, at a temperature of 80° C. to 200° C., preferably at a temperature of 90° C. to 150° C. A heating time in the step (2) can be 10 seconds to 10 minutes, preferably 30 second to 5 minutes.

The composition is heated under conditions where the composition of the present invention is not polymerized or not cured. By thus heating the composition, it is possible to remove a solvent contained in the composition. A method of removing a solvent from the composition is not limited to such heating, but other examples of the method encompass natural drying, draught drying, and drying under reduced pressure. In a case where any of these methods is employed, the method only needs to be carried out before the step (2).

In addition, heating the composition allows a liquid crystal phase of the liquid crystal compound, which is contained in the composition, to be transitioned to a nematic phase or an isotropic phase. In a case where the liquid crystal phase of the liquid crystal compound is transitioned to a smectic phase via an isotropic phase or via a nematic phase, measuring a phase transition temperature of the liquid crystal compound allows conditions for controlling the liquid crystal phase (conditions for heating the composition) to be determined. Conditions for measuring the phase transition temperature will be discussed in Examples of the present application.

In the step (2), the composition is heated to a temperature at which the liquid crystal compound contained in the composition shows a nematic phase or an isotropic phase. Then, in the step (3) by which the step (2) is followed, the composition is cooled to a temperature at which the liquid crystal compound shows a smectic phase.

In the step (3), a cooling temperature can be set to a temperature equal to or less than 60° C. in order to more suitably subject the composition, which has been heated, to smectic liquid crystal alignment. A cooling temperature is room temperature such as 30° C. from the viewpoint that such a temperature allows the optical film to be easily produced.

In the composition of the present invention, a trans isomer and a cis isomer of the smectic liquid crystal compound having a 1,4-cyclohexyl group are contained in certain amounts. Therefore, even in a case where the liquid crystal compound contained in the composition is temporarily put in a supercooled state after the liquid crystal compound is transitioned to a smectic phase, crystallization of the liquid crystal compound can be still restricted. This allows the liquid crystal compound to be maintained in a higher-order smectic phase.

In a case where a trans isomer and a cis isomer contained in the composition of the present invention each have a polymerizable group, the method of producing the optical film of the present invention can include the following steps (1') through (4):
(1') applying, to a base material, the composition of the present invention which contains a trans isomer and a cis isomer each having a polymerizable group;
(2) heating the composition which has been thus applied to the base material;

(3) cooling the composition, which has been thus heated, to a temperature equal to or less than 30° C. so as to subject the composition to smectic liquid crystal alignment; and
(4) polymerizing the composition which has been thus subjected to the smectic liquid crystal alignment.

In the step (1'), as in the step (1) described earlier, it is preferable to carry out, before applying the composition of the present invention to the resin base material, the step of adjusting the viscosity of the composition. In addition, a method of applying the composition of the present invention in the step (1') is also carried out as in the step (1) described earlier.

The steps (2) and (3) are carried out in an identical manner in the above two methods of producing the optical film. Conditions such as the heating temperature, the heating time, the cooling temperature, and the cooling time are also identical in the above two methods of producing the optical film.

In the step (4), a method of polymerizing the composition, which has been subjected to smectic liquid crystal alignment, is not limited to any particular one. Examples of the method of polymerizing the composition encompass a method in which the composition is irradiated with an active energy ray. As discussed in the description of the step (3), the composition of the present invention can allow the liquid crystal compound, which is contained in the composition, to be maintained in a higher-order smectic phase. This allows the composition to be polymerized while the liquid crystal compound is sufficiently aligned.

EXAMPLES

The following description will discuss the present invention in more detail with Examples. Note that "%" and "part(s)" in Examples mean "mass %" and "part(s) by mass," respectively, unless otherwise specified.

[Production of Liquid Crystal Compound]

Production Example 1

According to the method disclosed in lub et al., Recl.Trav.Chim.Pays-Bas, 115, 321-328 (1996), a liquid crystal composition (1) was produced. The liquid crystal composition (1) contained (i) 63 mass % of a compound which was a trans isomer and which was represented by a formula (A-1) (hereinafter, such a compound may be referred to as "Compound (A-1)") and (ii) 37 mass % of a compound which was a cis isomer and which was represented by a formula (A-2) (hereinafter, such a compound may be referred to as "Compound (A-2)").

Note that in the present example, a mixing ratio between the trans isomer and the cis isomer was analyzed by use of liquid chromatography (LC) under conditions shown in the following Table 1:

TABLE 1

| | |
|---|---|
| Steps applied | Step 5-1~6 |
| Column | Kinetex C18 (4.6 mm φ × 100 mm, 2.6 μm) + Guard column SUMPAXHOLDER COS |
| Moving bed | A: 0.1 mM PIC TBA-HS*/water [PIC TBA-HS* 0.102 g/Pure water 3000 mL] B: 0.1 mM PIC TBA-HS*/acetonitrile [PIC TBA-HS* 0.102 g/acetonitrile 3000 mL] |
| Gradient | 0.1 min B = 2% 20 min B = 65.3% 40 min B = 100% 50 min B = 100% 50.1 min B = 2% 60 min STOP TOTAL Analysis Time 60 minutes |
| Column temperature | 40° C. |
| Flow rate | 1.0 mL/min |
| Detector | UV 220 nm |
| Pouring amount | 5 μL |
| ISS* | n-decylbenzene |

*TBA-HS = Tetrabutylammonium hydrogensulfate
*ISS = Internal standard material

While the liquid crystal composition (1) was being heated, a texture of the liquid crystal composition (1) was observed with the use of a microscope. It was then observed that the liquid crystal composition (1) did not show liquid crystallinity.

Production Example 2

The liquid crystal composition (1) was subjected to a column purification treatment. As a filler for the column purification treatment, an activated alumina (neutral) (manufactured by Merck Ltd., Aluminiumu Oxide 90 active neutral, particle size: 63 m to 200 μm) was used. As a mobile phase, chloroform (manufactured by KANTO CHEMICAL CO., INC., for organic synthesis) was used. Through the column purification treatment, Compound (A-1) and Compound (A-2) in the liquid crystal composition (1) were separated from each other. This resulted in a liquid crystal composition (2) which contained 100 mass % of Compound (A-1), that is, which was made only of Compound (A-1).

While the liquid crystal composition (2) was being heated, a texture of the liquid crystal composition (2) was observed with the use of a microscope. It was then observed that the liquid crystal composition (2) showed liquid crystallinity.

[Chem. 13]

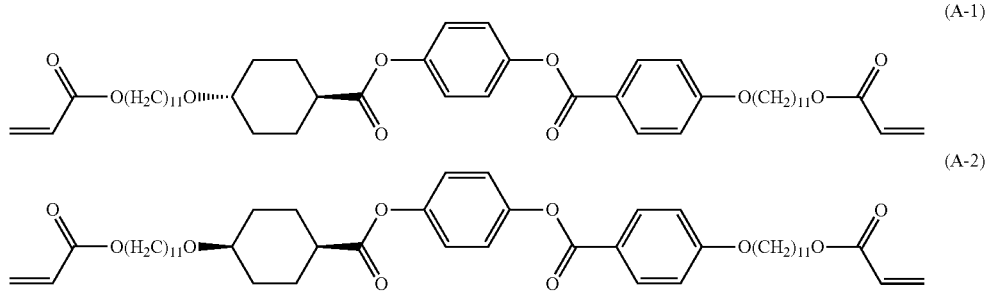

[Measurement of Phase Transition Temperature of Liquid Crystal Composition (Liquid Crystal Compound)]

A phase transition temperature of the liquid crystal composition (1) was measured by, while the liquid crystal composition (1) was being heated on an alignment film provided on a glass substrate, observing the texture of the liquid crystal composition (1) with the use of a polarizing microscope (BX-51, manufactured by Olympus Corporation). It was then observed that the liquid crystal composition (1) did not show liquid crystallinity.

By use of a similar method, a phase transition temperature of the liquid crystal composition (2) (Compound (A-1)) was measured. Then, in the liquid crystal composition (2), during a temperature rise, a phase transition to an isotropic liquid phase (I) was observed at 130° C. Then, during a temperature fall, (i) a phase transition to a nematic phase (N) (I→N) was observed at 116° C., (ii) a phase transition to a smectic A phase (SmA) (→SmA) was observed at 110° C., and (iii) a phase transition to a smectic B phase (SmB) (→SmB) was observed at 80° C.

Example 1

[Production of Liquid Crystal Composition]

A liquid crystal composition (3) was obtained by mixing 95 parts by mass of the liquid crystal composition (2) and 5 parts by mass of the liquid crystal composition (1). The liquid crystal composition (3) contained, relative to 100 parts by mass of Compound (A-1) which was a trans isomer, 1.9 parts by mass of Compound (A-2) which was a cis isomer.

[Production of Composition]

Composition (1) was obtained by mixing the following components and then stirring the mixture at 80° C. for 1 hour:

Liquid crystal composition: 100 parts of liquid crystal composition (3)

Dichroic dye: 2.5 parts of compound represented by the following formula (B)

[Chem. 14]

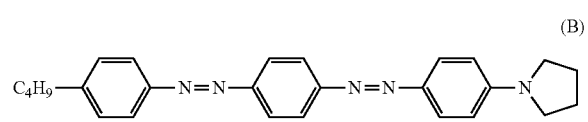

(B)

The compound represented by the formula (B) was produced according to the method disclosed in Japanese Patent Application Publication, Tokukai, No. 2013-101328.

Polymerization initiator: 6 parts of 2-dimethylamino-2-benzyl-1-(4-morpholinophenyl)butane-1-one (Irgacure 369; manufactured by Ciba Specialty Chemicals)

Leveling agent: 0.3 parts of polyacrylate compound (BYK-361N; manufactured by BYK-Chemie)

Solvent: 250 parts of o-xylene

[Measurement of Phase Transition Temperature of Composition]

By use of a method similar to the method of measuring the phase transition temperatures of the above liquid crystal composition (liquid crystal compound), phase transition temperatures of Composition (1) (I→N, →SmA, and →SmB) were measured. The results are shown in Table 2.

[Production of Optical Film]

As a transparent base material, a glass base material was used.

2 mass % aqueous solution of polyvinyl alcohol (Poly (vinyl Alcohol) 1000, completely saponified, manufactured by Wako Pure Chemical Industries, Ltd.) (composition for formation of an alignment film) was applied to the glass base material by use of a spin coating method, and was then dried. Then, an alignment film having a thickness of 100 nm was formed. Then, a surface of the alignment film thus obtained was subjected to a rubbing treatment. The rubbing treatment was carried out (i) by use of a semi-automatic rubbing device (product name: LQ-008 type, manufactured by Joyo Engineering Co., Ltd.), (ii) with the use of cloth (product name: YA-20-RW, manufactured by Yoshikawa Chemical Co., Ltd.), and (iii) under conditions where: the pushing amount was 0.15 mm; and the rotation speed was 500 rpm and 16.7 mm/s. By carrying out the rubbing treatment, an alignment film having alignment force was formed on the glass base material.

Composition (1) was applied to the alignment film by use of a spin coating method, dried by heating on a hot plate at 120° C. for 2 minutes, and was rapidly cooled to room temperature of 23° C., so that a dry film was formed on the alignment film. The dry film was observed for 10 minutes by use of a microscope to check whether or not crystallization had occurred. Then, there was no crystallization observed on the dry film. Then, a laminated body, which (i) was produced by the above method, (ii) had the alignment film on the glass substrate, and (iii) had the dry film on the alignment film, was irradiated with ultraviolet light of a light exposure of 1000 mJ/cm$^2$ (based on a wavelength of 365 nm) from a dry film-side with the use of a UV light irradiation device (SPOT CURE SP-7; manufactured by Ushio Inc.) in a nitrogen atmosphere. This allowed a liquid crystal compound, which was contained in the dry film, to be polymerized while a liquid crystalline state was maintained, so that a polymerized film was formed. By the method above, an optical film containing the polymerized film was obtained. A thickness of the polymerized film was measured with the use of a laser microscope (OLS3000, manufactured by Olympus Corporation). It was then observed that the thickness of the polymerized film was 2 μm.

[Measurement of Dichroic Ratio]

An absorbance ($A^1$) along a transmission axis and an absorbance ($A^2$) along an absorption axis at a maximum absorption wavelength of the optical film obtained by the above method were measured (i) with the use of device obtained by setting a folder with a polarizer to a spectrophotometer (UV-3150, manufactured by Shimadzu Corporation) and (ii) by use of a double beam method. On a reference side of the folder, a mesh for cutting an amount of incident light by 50% was provided. Based on the absorbance ($A^1$) along the transmission axis and the absorbance ($A^2$) along the absorption axis thus measured, an absorbance ratio ($A^2/A^1$) was calculated, and was treated as a dichroic ratio of the optical film. It can be said that an optical film (polarizing film) having a higher dichroic ratio is more useful. Table 2 shows measurements of (i) the maximum absorption wavelengths at which the absorbance ($A^2$) along the absorption axis was measured and (ii) the dichroic ratios of the optical film at the maximum absorption wavelengths.

Example 2

A composition and an optical film were produced as in Example 1 except that Compound (C) was used instead of Compound (B). In addition, by use of a method similar to that described in Example 1, properties (phase transition temperature, polarizability, and presence/absence of crystallization at 23° C. etc.) of the composition and the optical film obtained were measured. The results are shown in Table 2.

[Chem. 15]

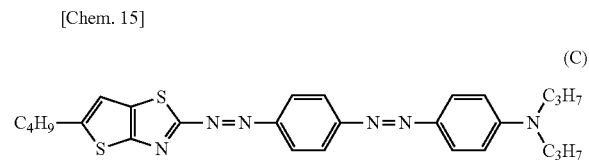

(C)

Examples 3 through 8, Comparative Examples 1 through 4

A composition and an optical film were produced as in Example 1 except that the mixing ratio of the liquid crystal compound and the type of dichroic dye were changed as shown in Table 2. In addition, by use of a method similar to that described in Example 1, properties (phase transition temperature, polarizability, and presence/absence of crystallization at 23° C. etc.) of the composition and the optical film obtained were measured. The results are shown in Table 2.

containing a liquid crystal composition in which an amount of a cis isomer contained was equal to or less than 10 parts by mass.

From the above matters and the results shown in Table 2, it was indicated that no crystallization around 23° C. was observed in the compositions produced in Examples 1 through 8, and that the compositions can therefore be suitably polymerized at a temperature around room temperature. It was also indicated that the optical films produced in Examples 1 through 8 showed dichroic ratios higher than those of the optical films produced in Comparative Examples 3 and 4.

INDUSTRIAL APPLICABILITY

A smectic liquid crystal compound contained in the composition of the present invention can be polymerized at a temperature around room temperature. Therefore, the composition of the present invention can be used as a raw material of an optical film for producing a homogeneous optical film at a temperature around room temperature.

TABLE 2

| | Liquid crystal compound | | | | | Phase transition temperature (° C.) | | | Polarizability | | |
|---|---|---|---|---|---|---|---|---|---|---|---|
| | Liquid crystal composition (2) | Liquid crystal composition (1) | trans | cis | Dichroic pigment | I→N | →SmA | →SmB | λMAX | Dichroic ratio | Crystallization at 23° C. |
| Example 1 | 95 | 5 | 100 | 1.9 | Compound (B) | 111 | 106 | 77 | 550 | 57 | Yes |
| Example 2 | | | | | Compound (C) | | | | 640 | 80 | Yes |
| Example 3 | 93 | 7 | 100 | 2.8 | Compound (B) | 110 | 106 | 77 | 550 | 66 | Yes |
| Example 4 | | | | | Compound (C) | | | | 640 | 78 | Yes |
| Example 5 | 90 | 10 | 100 | 4.1 | Compound (B) | 108 | 105 | 75 | 550 | 43 | Yes |
| Example 6 | | | | | Compound (C) | | | | 640 | 55 | Yes |
| Example 7 | 80 | 20 | 100 | 9.2 | Compound (B) | 104 | 103 | 74 | 550 | 41 | Yes |
| Example 8 | | | | | Compound (C) | | | | 640 | 53 | Yes |
| Comparative Example 1 | 100 | 0 | 100 | 0 | Compound (B) | 116 | 110 | 80 | 550 | 60 | No |
| Comparative Example 2 | | | | | Compound (C) | | | | 640 | 77 | No |
| Comparative Example 3 | 70 | 30 | 100 | 15.8 | Compound (B) | N/A | 101 | 69 | 544 | 16 | Yes |
| Comparative Example 4 | | | | | Compound (C) | | | | 632 | 22 | Yes |

[Results]

In each of Comparative Examples 1 and 2, a composition not containing a cis isomer was applied to an alignment film, dried by heating on a hot plate at 120° C. for 2 minutes, and rapidly cooled to room temperature of 23° C., so that a dry film was obtained. The dry film was observed for 10 minutes by use of a microscope to check whether or not crystallization had occurred. Then, as shown in Table 2, crystallization was observed in the dry film in each of Comparative Examples 1 and 2.

In each of Comparative Examples 3 and 4, a dichroic ratio of an optical film was measured, which optical film was produced by use of a composition containing a liquid crystal composition in which an amount of a cis isomer contained was more than 10 parts by mass. Then, as shown in Table 2, the optical film showed a dichroic ratio lower than that of an optical film which was produced by use of a composition

The invention claimed is:

1. A composition comprising smectic liquid crystal compounds, each having a 1,4-cyclohexyl group,
   wherein the composition contains 0.1 parts by mass to 10 parts by mass of a smectic liquid crystal compound having a cis-1,4-cyclohexyl group relative to 100 parts by mass of a smectic liquid crystal compound having a trans-1,4-cyclohexyl group,
   the smectic liquid crystal compound having the trans-1,4-cyclohexyl group and the smectic liquid crystal compound having the cis-1,4-cyclohexyl group are represented by the following formula (1-1) and formula (2-1), respectively:

$P^1\text{-}F^1\text{-}B^1\text{-}CyH\text{-}G^1\text{-}E^1\text{-}G^2\text{-}E^2\text{-}B^2\text{-}F^2\text{-}P^2$ (1-1)

$P^1\text{-}F^1\text{-}B^1\text{-}CyH'\text{-}G^1\text{-}E^1\text{-}G^2\text{-}E^2\text{-}B^2\text{-}F^2\text{-}P^2$ (2-1)

wherein in each of the formulas (1-1) and (2-1):
P¹ and P² each independently represent a polymerizable group, P¹ in the formula (1-1) and P¹ in the formula (2-1) are identical groups, and P² in the formula (1-1) and P² in the formula (2-1) are identical groups;
at least one of F¹ and F² represents a C6-C12 linear alkanediyl group, a hydrogen atom contained in the alkanediyl group can be substituted by a halogen atom, and —CH₂— contained in the alkanediyl group can be substituted by —O—, F¹ in the formula (1-1) and F¹ in the formula (2-1) are identical groups, and F² in the formula (1-1) and F² in the formula (2-1) are identical groups;
B¹ and B² each independently represent a single bond or a bivalent linking group, B¹ in the formula (1-1) and B¹ in the formula (2-1) are identical groups, and B² in the formula (1-1) and B² in the formula (2-1) are identical groups;
CyH represents a substituted or unsubstituted trans-1,4-cyclohexyl group;
CyH' represents a substituted or unsubstituted cis-1,4-cyclohexyl group;
G¹ and G² each independently represent a single bond or a bivalent linking group, G¹ in the formula (1-1) and G¹ in the formula (2-1) are identical groups, and G² in the formula (1-1) and G² in the formula (2-1) are identical groups; and
E¹ and E² each independently represent a group selected from a substituted 1,4-phenyl group, an unsubstituted 1,4-phenyl group, a substituted trans-1,4-cyclohexyl group, and an unsubstituted trans-1,4-cyclohexyl group, E¹ in the formula (1-1) and E¹ in the formula (2-1) are identical groups, and E² in the formula (1-1) and E² in the formula (2-1) are identical groups.

2. The composition as set forth in claim 1, wherein the smectic liquid crystal compound represented by the formula (1-1) and the compound represented by the formula (2-1) are represented by the following formula (1-2) and formula (2-2), respectively:

P¹-F¹-B¹-CyH-G¹Ph-G²-Ph-B²-F²-P²     (1-2)

P¹-F¹-B¹-CyH'-G¹Ph-G²-Ph-B²-F²-P²     (2-2)

wherein in each of the formulas (1-2) and (2-2):
P¹, P², F¹,F²,B¹,B²,CyH, CyH', G¹, and G² represent respective groups identical to corresponding ones of the groups representing P¹, P², F¹, F², B¹, B², CyH, CyH', G¹, and G² in the formulas (1-1) and (2-1); and
Ph represents a substituted or unsubstituted 1,4-phenyl group.

3. The composition as set forth in claim 1, wherein
B¹ and B² each independently represent a single bond or a bivalent linking group represented by —O—; and
G¹ and G² each independently represent a bivalent linking group represented by —C(=O)—O—.

4. The composition as set forth in claim 1, wherein P¹ and P² each independently represent an acryloyloxy group.

5. The composition as set forth in claim 1, further comprising a dichroic dye.

6. The composition as set forth in claim 5, wherein the dichroic dye is a compound represented by the following formula (3-1):

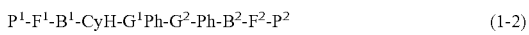
K¹-L¹-Ar¹—N=N—Ar²—(N=N—Ar³)ₚ-L²-K²     (3-1)

wherein:
K¹ and K² each independently represent a functional group selected from the group consisting of a C1-C12 chain alkyl group, a C5-C6 cyclic alkyl group, an N-piperidinyl group, an N-piperazinyl group, an N-pyrrolidinyl group, an N-morpholinyl group, an N,N-diethylamino group, a cyano group, and a sulfonylmethyl group;
L¹ and L² each independently represent a single bond or a bivalent linking group;
Ar¹ through Ar³ each independently represent (i) a substituted or unsubstituted 1,4-phenylene group, (ii) a substituted or unsubstituted naphthalene-1,4-diyl group, or (iii) a bivalent heterocyclic group which can have a substituent; and
p represents an integer selected from 0 to 2.

7. The composition as set forth in claim 6, wherein the compound represented by the formula (3-1) is a compound represented by the following formula (3-2):

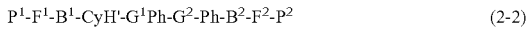
K¹-L¹-Ar¹—N=N—Ar²—N=N—Ar³-L²-K²     (3-2)

wherein K¹,K²,L¹,L²,Ar¹, Ar²,Ar³ are same as those of the formula (3-1).

8. The composition as set forth in claim 1, wherein the composition is a raw material of an optical film.

9. An optical film comprising the composition as set forth in claim 1, the optical film having a dichroic ratio of equal to or more than 30.

10. An optical film comprising (i) a polymer of the smectic liquid crystal compound having the trans-1,4-cyclohexyl group which is a smectic liquid crystal compound having the trans-1,4-cyclohexyl group contained in the composition as set forth in claim 1 and (ii) a polymer of the smectic liquid crystal compound having the cis-1,4-cyclohexyl group which is a smectic liquid crystal compound having the cis-1,4-cyclohexyl group contained in the composition as set forth in claim 1,
the optical film having a dichroic ratio of equal to or more than 30.

11. A method of producing an optical film, comprising the steps of:
(1) applying the composition as set forth in claim 1 to a resin base material so as to shape the composition into a form of a film;
(2) heating the composition which has been thus shaped into the form of a film; and
(3) cooling the composition, which has been thus heated, to a temperature equal to or less than 30° C. so as to subject the composition to smectic liquid crystal alignment.

* * * * *